(12) United States Patent
Bell et al.

(10) Patent No.: US 11,742,891 B1
(45) Date of Patent: Aug. 29, 2023

(54) RF-ABSORBER PIM HUNTING SYSTEMS

(71) Applicant: ConcealFab, Inc., Colorado Springs, CO (US)

(72) Inventors: Thomas Bell, Colorado Springs, CO (US); Jacob Lovelady, Colorado Springs, CO (US); Evangelos Economou, Colorado Springs, CO (US); Steve Rogers, Colorado Springs, CO (US)

(73) Assignee: ConcealFab, Inc., Colorado Springs, CO (US)

( * ) Notice: Subject to any disclaimer, the term of this patent is extended or adjusted under 35 U.S.C. 154(b) by 0 days.

(21) Appl. No.: 18/188,011

(22) Filed: Mar. 22, 2023

Related U.S. Application Data

(60) Provisional application No. 63/322,435, filed on Mar. 22, 2022.

(51) Int. Cl.
*H01Q 1/24* (2006.01)
*H04B 1/525* (2015.01)

(52) U.S. Cl.
CPC ............. *H04B 1/525* (2013.01); *H01Q 1/24* (2013.01); *H01Q 1/246* (2013.01)

(58) Field of Classification Search
CPC ........... H01Q 1/246; H01Q 1/24; H04B 1/525
USPC .................................................... 343/700 R
See application file for complete search history.

(56) References Cited

U.S. PATENT DOCUMENTS

| | | | |
|---|---|---|---|
| 10,429,423 B2 | 10/2019 | Bell | |
| 10,716,247 B2 * | 7/2020 | Fujita | H05K 9/0083 |
| 10,778,343 B2 | 9/2020 | Bell | |
| 2005/0001780 A1 * | 1/2005 | Aisenbrey | B29C 45/0013 |
| | | | 343/873 |
| 2012/0056890 A1 * | 3/2012 | Mignard | G02B 26/001 |
| | | | 156/719 |

\* cited by examiner

*Primary Examiner* — Hai V Tran
(74) *Attorney, Agent, or Firm* — Mehrman Law Office; Michael J. Mehrman

(57) ABSTRACT

RF-absorber assemblies for assisting PIM hunting at cellular base station antennas. An RF-absorber panel section includes a non-absorbing spacer layer adjacent to an antenna under evaluation. An RF-absorbing layer is positioned adjacent to the non-absorbing spacer layer. A low-PIM RF-shield layer is positioned adjacent to the RF-absorbing layer, so that the RF-absorbing layer is positioned between the RF-shield layer and the non-absorbing spacer layer. RF-absorber panel assembly kits include RF-absorber panel sections that removably attach to each other and to an assembly cover, which removably attaches over a panel antenna. A cylindrical assembly for a multi-directional antennas includes tapered RF-absorber sections within a cylindrical RF-absorber. An iris allows directional PIM hunting with the cylindrical RF-absorber. A PIM hunting procedure utilizes a full-perimeter RF panel assembly for directional PIM hunting. A directional RF-absorber panel assembly includes front and rear RF-absorber panel assemblies and lateral RF-shield blankets.

20 Claims, 18 Drawing Sheets

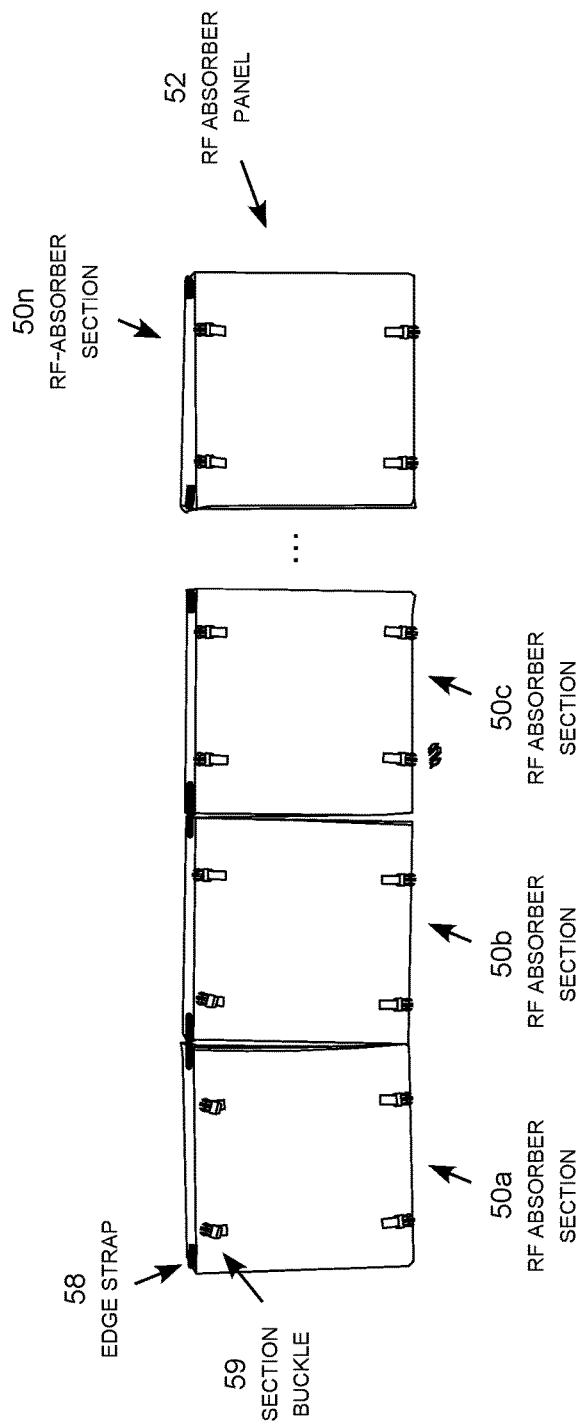
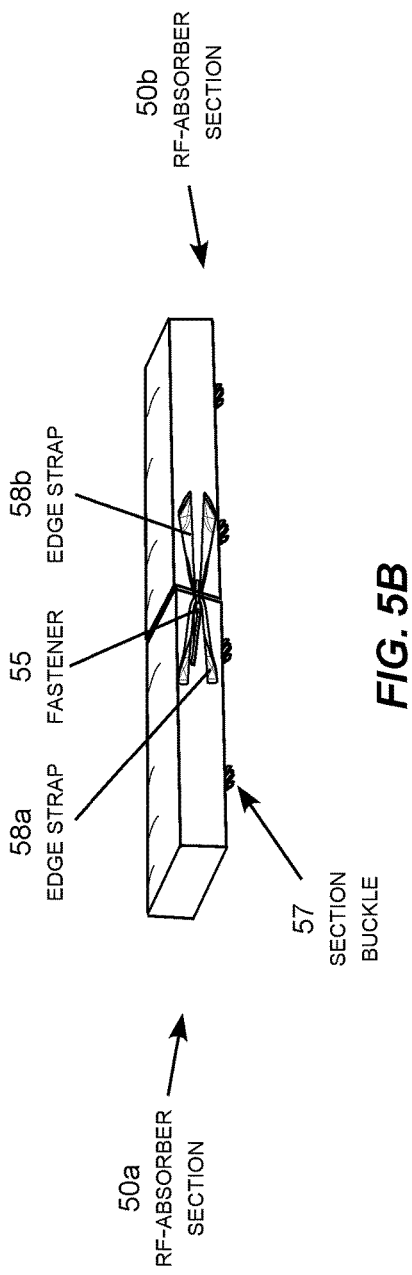
FIG. 5A
FIG. 5B

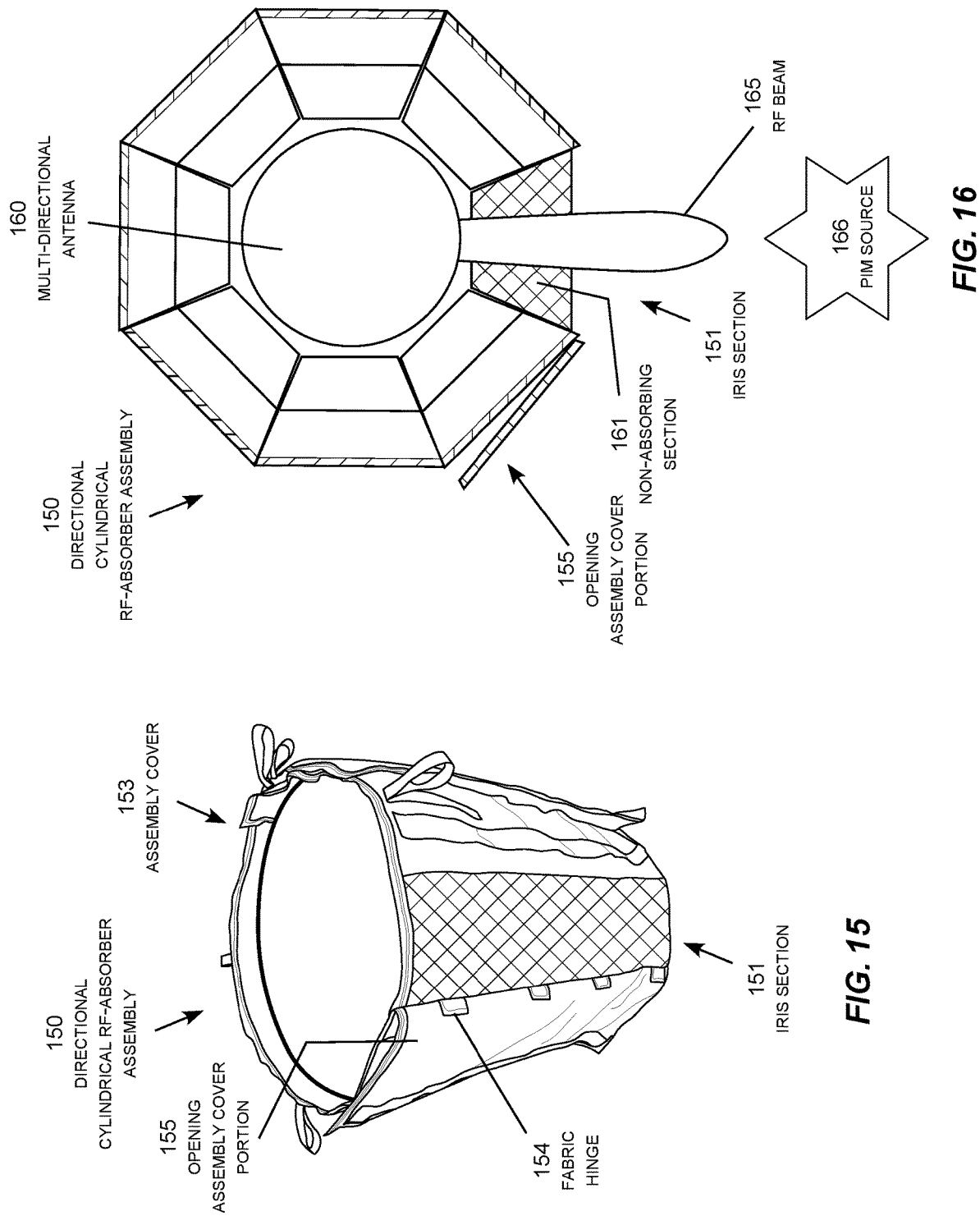

RF-ABSORBER PIM HUNTING SYSTEMS

REFERENCE TO RELATED APPLICATIONS

This application claims priority to U.S. Provisional Patent Application Ser. No. 63/322,435 filed Mar. 22, 2022, which is incorporated by reference.

TECHNICAL FIELD

The present invention is directed to cellular communication systems and, more particularly, to RF-absorber "PIM hunting" systems to aid in identification of external sources of passive intermodulation interference ("PIM") at cellular telephone base station antenna sites.

BACKGROUND

Passive intermodulation known as "PIM" is a well-known type of electromagnetic interference in cellular systems. Downlink signals at cellular base stations mix at passive, non-linear junctions in the radio frequency (RF) path, creating new signals. If these new signals (intermodulation products) fall in the transmitting antenna's uplink band, they can elevate the noise floor and degrade system performance. Mobile operators require testing at multiple steps while building cell sites to detect and mitigate PIM. RF components are first tested by manufacturers before leaving the factory using factory PIM test equipment in accordance with standard IEC 62037 promulgated by the International Electrotechnical Commission (IEC) to verify that the individual components are low-PIM.

In conventional PIM testing procedures, two test signals (F1, F2) corresponding to the base station antenna's downlink bands are generated by a PIM analyzer, combined and transmitted to potential PIM sources under test. PIM produced by the structures illuminated by the test signals propagates in all directions. PIM returning to the PIM analyzer passes through a series of filters and a low noise amplifier before arriving at the test instrument receiver.

After the RF components are assembled at the cell site, a second PIM test is conducted using field PIM test equipment. This test verifies that the entire RF path is low-PIM, including the antenna feed system as well as the environment around the antenna. Failures due to PIM sources inside the antenna feed system, referred to as "internal" PIM sources, are relatively easy to locate. Software features known as "distance-to-PIM" are available from most PIM test equipment manufacturers to identify how far the offending PIM source is located from the test analyzer. This information combined with the knowledge that PIM usually occurs at RF connections enables technicians to quickly locate internal PIM sources and make repairs.

PIM sources located beyond the antenna, referred to as "external" PIM sources, are significantly more difficult to locate. Distance-to-PIM estimates provide an indication of how far the PIM source is from the antenna but do not provide any guidance on the direction. Methods have been developed utilizing a PIM probe as described in U.S. Pat. No. 10,429,423, which is incorporated by reference, to search the area around antennas to precisely locate sources of PIM. A representative figure illustrating the use of a PIM probe during PIM hunting at a cellular base station is shown in FIG. 1. Once a PIM source is located, it can be suppressed using a temporary RF barrier as described in U.S. Pat. No. 10,778,343, which is incorporated by reference, to determine how much improvement could be achieved with a permanent repair. A representative figure adapted from this patent illustrating the use of a temporary RF barrier during PIM hunting at a cellular base station is shown in FIG. 2.

Even with these improvements, guesswork is still required to determine where to begin hunting using a PIM probe. If the distance-to-PIM estimate shows that the PIM source is three meters away from the antenna, the test technician does not know whether to start hunting in front of, behind or to the side of the site antenna. Improved tools and techniques are therefore needed to guide technicians in the best direction when PIM hunting to reduce the over-all time required to locate external PIM sources at cell sites and other locations where similar types of noise may occur.

SUMMARY

The needs described above are met by an RF-absorber assembly for temporary attachment to antennas under evaluation. A non-absorbing spacer layer includes a leading face pointed toward and adjacent to the antenna, and a trailing face pointed away from the antenna. An RF-absorbing layer includes a leading face pointed toward the antenna and adjacent to the trailing face of the non-absorbing spacer layer, and a trailing face pointed away from the antenna. An RF-shield layer includes a leading face pointed toward the antenna and adjacent to the trailing face of the RF-absorbing layer, and trailing face pointed away from the antenna. An assembly cover removably secures the non-absorbing spacer layer, the RF-absorbing layer, and the RF-shield layer proximate to the antenna.

In an illustrative embodiment, the non-absorbing spacer layer is fabricated from a two-inch thick layer of open-cell polyurethane foam, and the RF-absorbing layer is fabricated from a two-inch thick layer of open-cell lightly carbon-loaded polyurethane foam imparting a single-pass transverse RF attenuation in the range of 8 dB to 15 dB to a 1,900 MHZ signal from the antenna. In addition, the RF-shield layer may be fabricated from a layer of metal foil. In an illustrative embodiment, a section cover houses the non-absorbing spacer layer, the RF-absorbing layer, and the RF-shield layer. Alternatively, the section cover may house the non-absorbing spacer layer and RF-absorbing layer, but not the RF-shield layer. In this case, the RF-shield layer may be embedded in the assembly cover.

In a RF-absorber panel assembly embodiment, the antenna is a panel antenna with a front face, and the leading face of the non-absorbing spacer layer is at least coextensive with the front face of the panel antenna. The leading face of the RF-shield layer is at least coextensive with the trailing face of the RF-absorbing layer. In a cylindrical RF-absorber embodiment, the antenna is a multi-directional antenna having an axial dimension, the non-absorbing spacer layer extends around the multi-directional antenna in an azimuthal direction surrounding the axial dimension of the multi-directional antenna. Similarly, the RF-absorbing layer surrounds the axial dimension in the azimuthal direction further away from the antenna than the non-absorbing spacer layer. Likewise, the RF-shield layer surrounds the axial dimension in the azimuthal direction further away from the antenna than the RF-absorbing layer.

In another alternative embodiment, a directional RF-absorber assembly includes an iris section lacking an RF-absorbing layer to avoid absorbing an RF beam transmitted by the antenna. The iris section also includes a non-reflecting or openable assembly cover portion to avoid reflecting the RF beam. In yet another alternative embodiment, a first RF absorber panel assembly is removably attached to a front side of the antenna, a second RF absorber panel assembly is removably attached to a rear side of the antenna, a first RF-shield blanket is removably attached to a first lateral side of the antenna, and a second RF-shield blanket is removably attached to a second lateral side of the antenna.

It will be understood that specific embodiments may include a variety of features in different combinations, as desired by different users. The specific techniques and systems for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the accompanying figures.

FIG. 5A is a perspective view of several RF-absorber sections assembled into an RF-absorber panel.

FIG. 5B is a detail illustration showing attachment of adjacent RF-absorber sections to each other.

FIG. 15 is a perspective view of a directional cylindrical RF-absorber assembly.

FIG. 16 is a sectional view of the directional cylindrical RF-absorber assembly.

DETAILED DESCRIPTION

Figure 1:
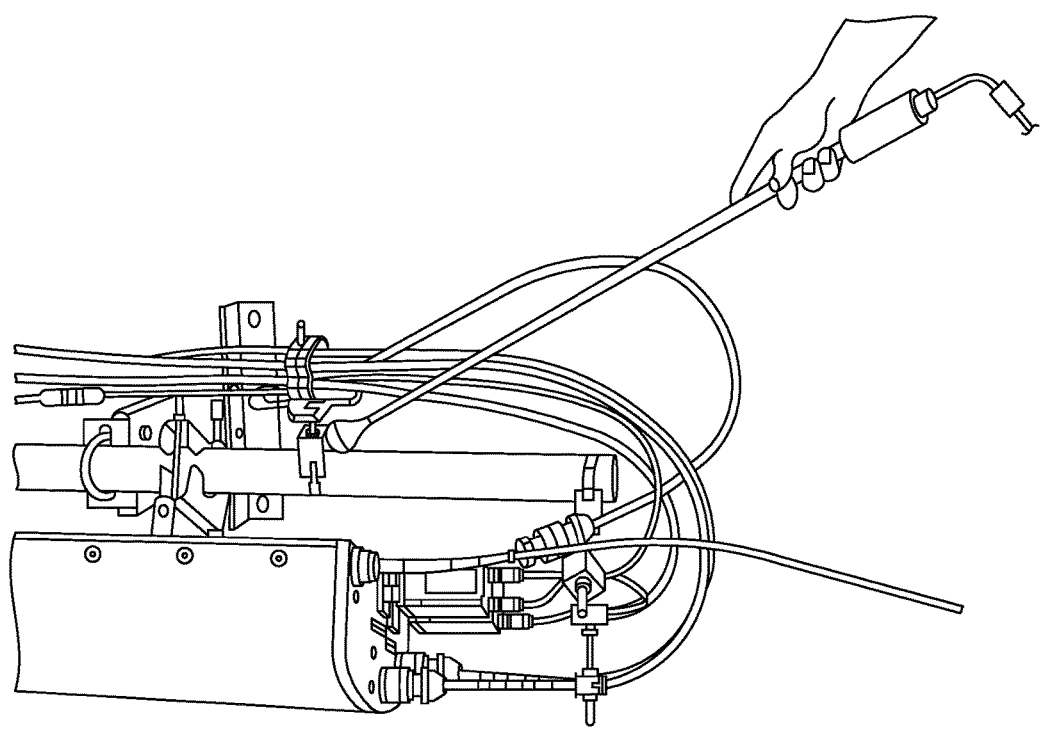
FIG. 1 (prior art) is a conceptual illustration of use of a PIM probe during PIM hunting at a cellular base station.
Figure 2:
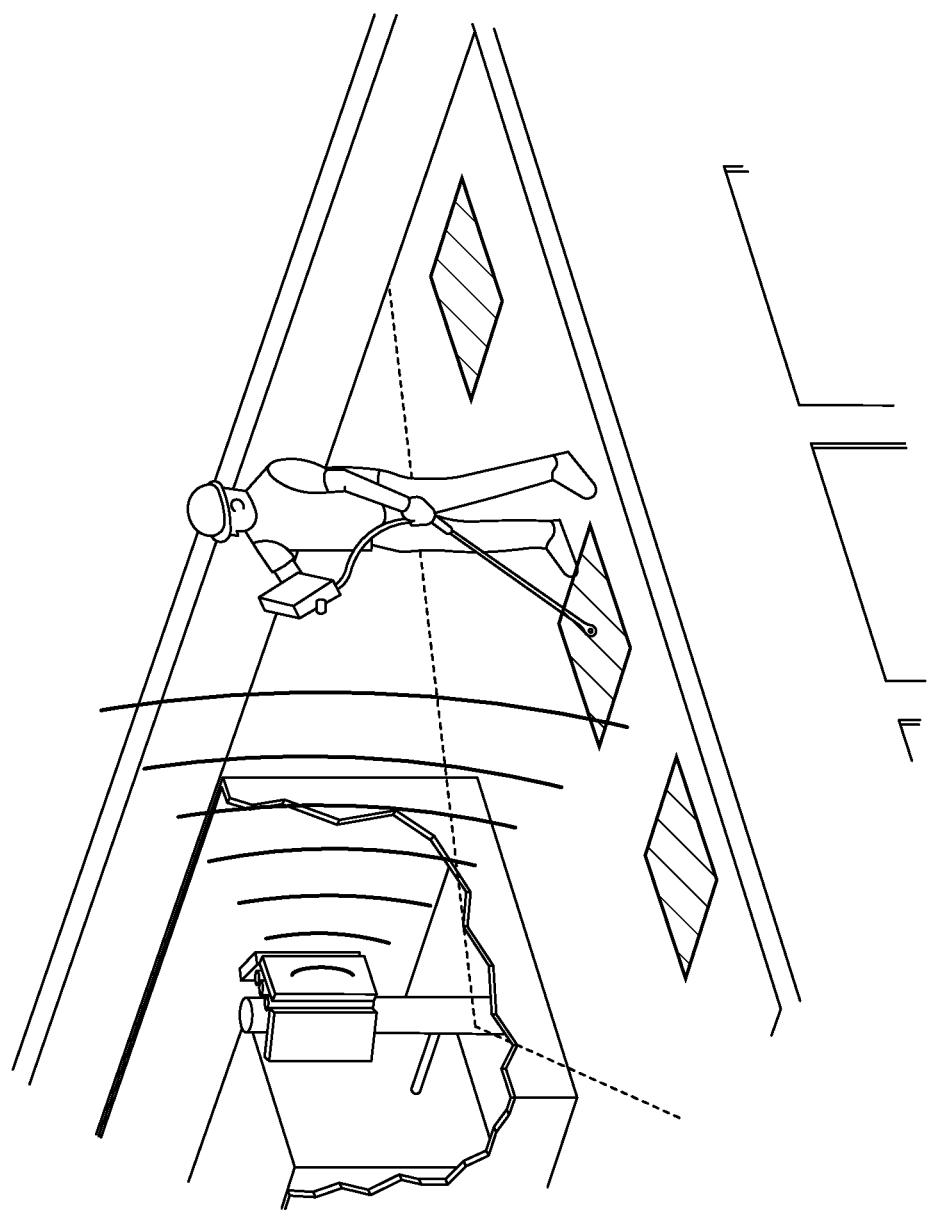
FIG. 2 (prior art) is a conceptual illustration of use of a temporary RF barrier during PIM hunting at a cellular base station.

Embodiments of the invention include RF-absorber assemblies, which may be supplied as kits or component parts, and methods for using the RF-absorber assemblies. The kits allow easy storage and portage of the disassembled RF-absorber to base station sites in carry bags, where they are easily assembled for temporary use. When the PIM testing is completed, the RF-absorber assembly is easily disassembled, returned to the carry bags, ported from the site, and stored for the next use. Each type of RF-absorber assembly includes a non-absorbing spacer layer, an RF-absorber layer, and an RF-shield layer. The layers are housed in a fabric assembly cover held together with a system of straps and buckles.

An RF-absorber placed over the front of an antenna for testing purposes typically includes a non-absorbing spacer layer, and lightly carbon-loaded RF-absorber layer, housed within a section cover. An additional RF-shield layer may be housed within the RF-absorber section covers, embedded in the assembly cover, or placed in another convenient location within the assembly. An RF-absorber placed over the rear of an antenna for testing purposes may include only an RF-absorber layer, while RF-shield blankets may be used to cover the sides of the antenna.

For an RF-absorber placed over the front of the antenna, the non-absorbing spacer layer is positioned adjacent to an antenna under evaluation, typically in direct contact with the radome on the front side of the antenna under evaluation. However, the term "adjacent" does not require direct touching, as certain types of additional covers, open space, fabric layers, films, other structures can be located between the RF-active layers of the RF-absorber without unduly impacting the operational performance of the assemblies. In general, an RF-absorbing layer is positioned adjacent to the non-absorbing spacer layer, and a low-PIM RF-shield layer is positioned adjacent to the RF-absorbing layer, so that the RF-absorbing layer is positioned between the RF-shield layer and the non-absorbing spacer layer. RF-absorber panel assembly kits include RF-absorber panel sections that removably attach to each other, and to the assembly cover, which removably attaches to a panel antenna. A cylindrical assembly for multi-directional antennas includes tapered RF-absorber sections forming a cylindrical RF-absorber. An iris allows directional PIM hunting with the cylindrical RF-absorber. A directional RF-absorber panel assembly includes front and rear RF-absorber panel assemblies and lateral RF-shield blankets. A PIM hunting procedure utilizes a full-perimeter RF panel assembly for directional PIM hunting.

Illustrative embodiments include an RF-absorber panel assembly configured for mounting on the front of a panel antenna to absorb RF energy emitted in a forward direction from the front of the panel antenna. A cylindrical RF-absorber assembly is at least coextensive with the axial dimension of the multi-directional antenna, and surrounds the multi-dimensional antenna in a azimuthal direction. The cylindrical RF-absorber assembly may be deployed in full-perimeter alternatives or directional alternatives. The directional cylindrical RF-absorber assembly includes a non-absorbing iris section to avoid absorbing the RF beam transmitted by the antenna, and an assembly cover with an openable or non-reflecting iris portion to avoid reflecting the beam. Together, these features allow directional beam transmission from the cylindrical RF-absorber assembly.

A full-perimeter RF-absorber panel assembly includes a front RF-absorber panel assembly, a rear RF-absorber panel assembly, and RF-shield layer blankets on opposing lateral sides of the pan& antenna, A test technician sequentially removes the RF-absorber panel assemblies and lateral RF-shield blankets, while testing the PIM reception nearby the antenna under evaluation at each step, to perform directional PIM evaluation. The disclosed principles of the invention can be used to fabricate other types of RF-absorber assemblies as a matter of design choice, such as top RF-absorbers, bottom RF-absorbers, side RF-absorbers, panel absorbers with apertures, rotatable panel absorbers with apertures, and so forth.

PIM sources located beyond an antenna, referred to as "external" PIM sources, can be a challenge to locate. PIM analyzers typically include a distance-to-PIM ("DTP") function that is very useful in aiding PIM hunts. Unfortunately, these measurements only identify how far the PIM source is from the antenna with no indication of direction. When the distance indicated by a PIM analyzer is less than 15 feet (4.5 m), experience has shown that the PIM source can be located directly behind or beside the antenna. As a result, guesswork is required to determine where to begin the PIM hunt.

Common public radio interface ("CPRI") analyzers can also be used to aid PIM hunts. These analyzers tap into the optical connection between the base band unit ("BBU") and a remote radio unit ("RRU") and allow the user to view the uplink spectrum for each branch. Repairing or covering the highest magnitude PIM source with an RF-absorber or RF-shield blanket reduces the average uplink noise level. Without a DTP function to aid the hunt, technicians using a CPRI analyzer for PIM evaluation must rely completely on intuition to determine where to start hunting.

In view of these shortcomings of conventional PIM hunting practices, merely knowing whether to look in front of the antenna or behind the antenna produces a significant benefit to the test technician. The RF-absorber PIM hunting systems described in this disclosure provide additional tools that can be used during the PIM hunt to help determine the directionality of PIM sources when using a PIM analyzer, or when using a CPRI analyzer to measure progress. For example, if the PIM magnitude or uplink noise level reduces when the front absorber kit is installed on the front of an antenna, the PIM source is likely in front of the antenna under evaluation. If the PIM magnitude or uplink noise level does not reduce (or increases) when the RF-absorber kit is installed on the front of the antenna, the PIM source is likely behind or beside the antenna.

In addition to PIM hunting, the RF-absorber assemblies can be used while site testing to help isolate the antenna and its feed system from the environment. If the PIM magnitude or uplink noise level decreases when a full-perimeter RF-absorber is installed on the antenna, it is a good indication that the largest noise source is beyond the antenna. If the PIM magnitude or uplink noise level does not change or increases when the full-perimeter RF-absorber assembly is installed, it is a good indication that the largest noise source is inside the antenna or its feed system. As an additional testing technique, a test technician places the antenna on plastic saw horses or stands, installs the RF-absorber, and tests the antenna for PIM. This eliminates the external environment to determine if whether the antenna itself is low PIM.

Macro cell sites typically deploy multiple directional antennas on an antenna support frame to provide multi-directional coverage to somewhat overlapping azimuthal sectors to provide 360-degrees of coverage. Many potential PIM sources are present on the antenna support frame behind and beside these directional antennas. Given that typical antenna support frames are 9 to 12 feet (3 to 4 meters) in width, significant time could be wasted probing all surfaces on the frame if the primary PIM source is located in front of the antenna. Likewise, probing the roof surface and parapet walls in front of an antenna at a rooftop installation could waste significant time if the primary PIM source is located behind the antenna.

One method that can be used to quickly determine if a PIM source is in front of or behind an antenna is to install an RF-absorbing foam layer of sufficient thickness on the front surface of the antenna. If the level of PIM measured by the PIM analyzer reduces when the RF-absorbing foam layer is installed on the front of the antenna under evaluation, the primary PIM source is likely in front of the antenna. If the level of PIM measured by the PIM analyzer does not decrease when the RF-absorbing foam layer is installed on the front face of the antenna, or if the PIM increases slightly, the primary PIM source is likely behind or beside the antenna.

For this method to work, the RF-absorber installed in front of the antenna must itself be low-PIM. If the RF-absorber is not low-PIM, the PIM reported by the PIM analyzer could increase when the absorber is installed even if the primary site PIM source is in front of the antenna. This would provide misleading information to the technician and send them searching in the wrong direction.

A second requirement is the RF-absorber must have sufficient attenuation to effectively block the main beam transmitted by the antenna. Referring to a representative carrier downlink signal frequency of 1,900 MHZ propagating transverse to the face of an absorber positioned proximate to the antenna under evaluation, the absorber should attenuate the forward signal in the range of 16 to 30 dB. If the absorber does not have sufficient attenuation, the PIM level reported by the PIM analyzer may not change significantly even if the PIM source is in front of the antenna. Here again, this provides confusing information to the test technician that could lead to false conclusions regarding the location of the PIM source.

A third requirement for the RF-absorber is minimum impact on the voltage standing wave ratio "(VSWR") of the antenna system when installed on the front face of the antenna. If the RF-absorbing layer creates a high impedance mismatch, RF energy will reflect at the face of the absorber rather than being absorbed. These reflected signals may illuminate PIM sources near the antenna with more energy than is normally experienced during operation. As a result, technicians could spend time locating and mitigating PIM sources that do not affect the performance of the site.

A fourth requirement is that the RF-absorber must be able to be quickly installed and removed from the site antenna. If significant time is required to install and remove a multitude of individual absorber pieces, the time savings is reduced. A fifth requirement is that the RF-absorber material should be durable and resist damage during repeated transportation, assembly, testing, disassembly, and return to storage.

Figure 17:
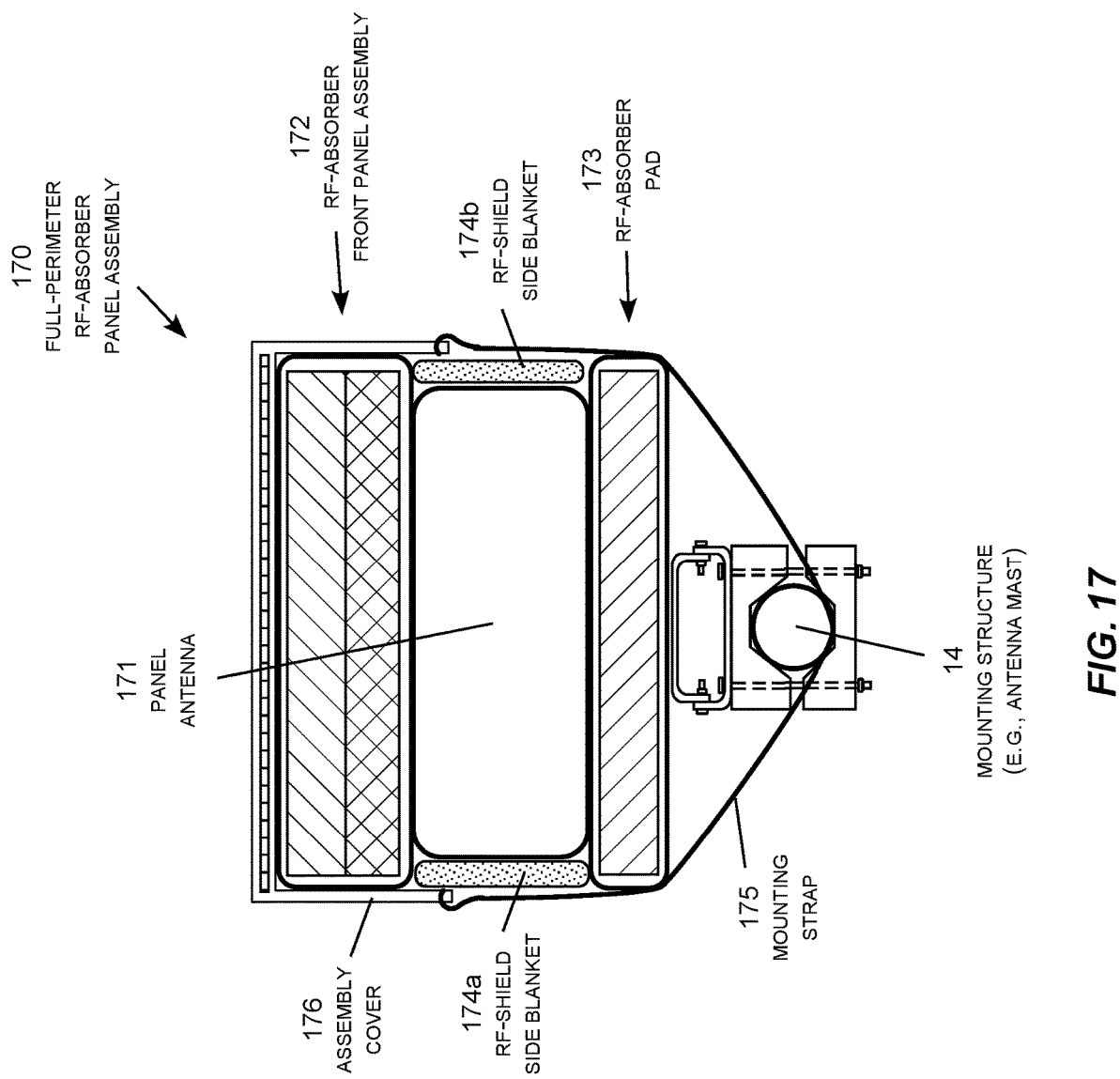
FIG. 17 is a sectional view of a full-perimeter RF-absorber panel assembly.
Figure 18:
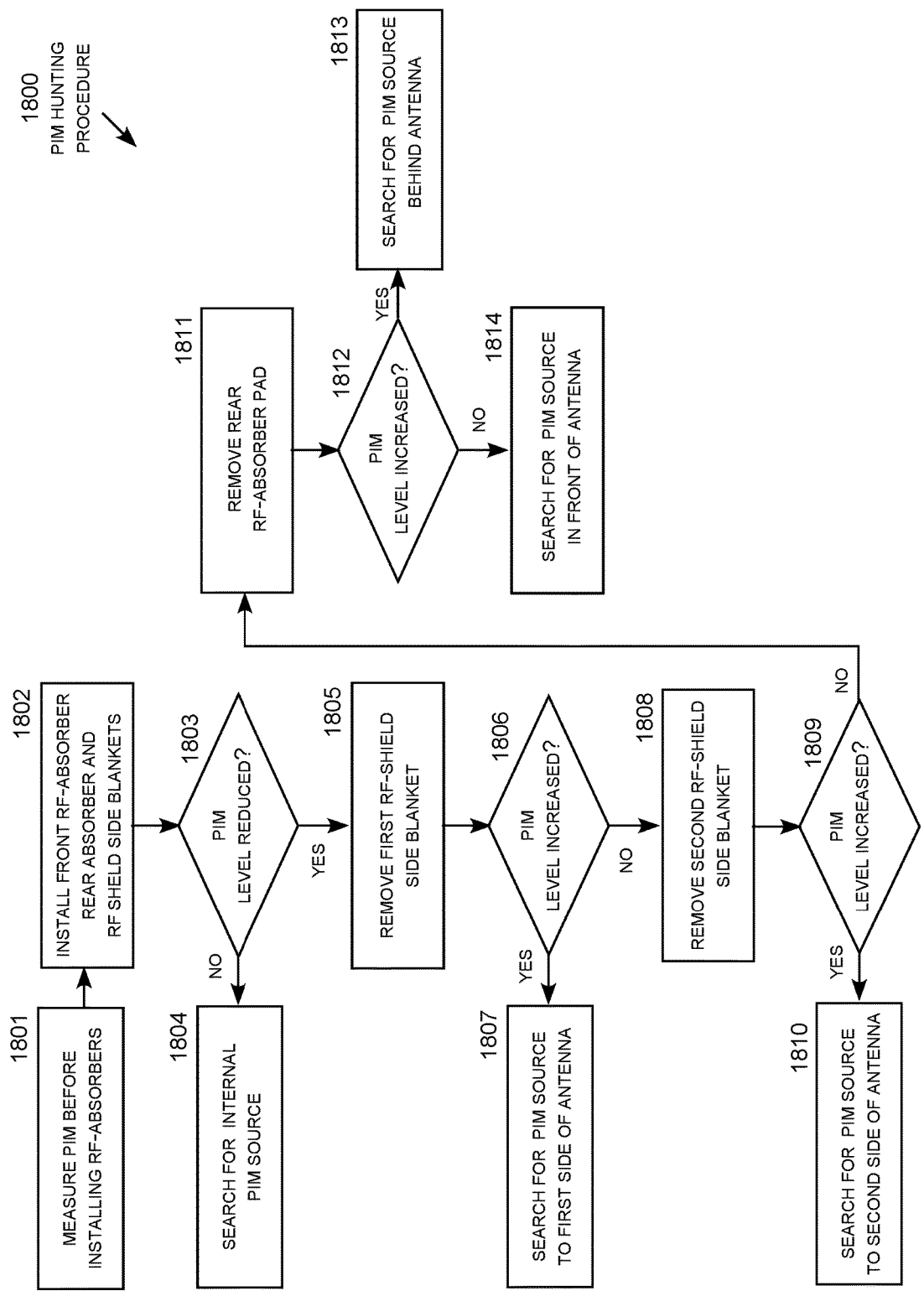
FIG. 18 is a logic flow diagram illustrating a PIM hunting procedure using the full-perimeter RF-absorber panel assembly.

Representative RF-absorber systems that meet these requirements are disclosed in FIGS. 3 through 17, along with a specific procedure for directional PIM hunting using a full-perimeter RF-absorber panel assembly illustrated in FIG. 18. The representative RF-absorber assemblies include four primary components. The first component is a non-absorbing spacer layer that can be placed adjacent to and, if desired, directly against the radome of the antenna under evaluation. The second component is a low-PIM RF-absorbing layer designed to absorb a sufficiently high amount of RF energy, while exhibiting a sufficiently low impact on VSWR. A section of the non-absorbing spacer layer and a section of the RF-absorbing are typically housed together within a section cover forming a standard-sized pad for easy handling. The third component is an outer assembly cover designed to secure multiple pads together as well as provide mounting features for removably attaching the RF-absorber assembly to the antenna under evaluation. The fourth component is a low-PIM RF-shield layer, which may be housed as sections inside pad section covers, embedded in the assembly cover, or otherwise incorporated into the RF-absorber assembly.

The RF-shield layer is designed to reflect RF radiation emitted by the antenna without creating substantial PIM. To accomplish this function, the RF-shield layer may be a substantially uniform, smooth metallic layer that reflects the incident RF energy at the desired carrier frequencies, producing a cross-layer RF attenuation at these frequencies of at least 20 dB. An absence of sharp edges or material discontinuities, such as wrinkles, aids in preventing PIM generation. Examples of low-PIM RF-shield layers include uncoated metal foil embedded or otherwise treated to avoid wrinkling, painted metal foil, metal foil coated with or adhered to a polymer carrier sheet, a metallic layer sprayed-on a polymer carrier sheet, or other generally smooth and uniform products containing electrically conductive sheeting. The section covers and assembly covers can be any suitably rugged fabric, such as nylon, acrylic, vinyl, or another durable, grime-resistant, weather-proof fabric to protect the internal components of the assembly from damage during repeated assembly, use, disassembly, transportation and storage.

The RF-shield layer, by itself, can reduce the forward transmission from the antenna under evaluation by at least 20 dB. This level of signal reduction, however, will be almost entirely due to reflection. To prevent the reflected energy from bouncing back in the direction of the emitting antenna and illuminating PIM sources behind the antenna, the RF-absorbing layer is positioned between the antenna and the RF-shield layer. Although a sufficiently thick layer of RF-absorber foam heavily loaded with carbon could achieve 20 dB attenuation by itself, a lightly loaded absorber foam has been found better suited for this application. In particular, it has been found that an RF-absorbing layer exhibiting single-pass attenuation in the range from 8 dB to 15 dB is better suited for this purpose. With this type of RF-absorber, the forward signal from the antenna passing through the RF-absorbing foam is attenuated 8 dB to 15 dB before reaching the RF-shield layer. When the diminished signal reflects at the RF-shield interface, it again passes through the RF-absorbing foam a second time before returning to the emitting antenna or illuminating PIM sources behind the antenna. The reflected signal, which is then 16 to 30 dB down from its original level, has been found to have a sufficiently low impact on the VSWR of the antenna system, while also having a sufficiently high level of PIM mitigation at the RF-absorbing interface.

The use of lightly loaded RF-absorbing foam is important for two reasons. First, lighter carbon loading reduces the impedance mismatch at the foam surface resulting in lower reflections, which reduces PIM created by other surfaces receiving the reflected RF energy. Second, the PIM performance of the RF-absorbing foam itself improves as the carbon loading level decreases. It has been found that using lightly loaded RF-absorbing foam achieves sufficiently high RF-attenuation, while sufficiently avoiding PIM generation, to meet these two somewhat competing design criteria.

In an illustrative embodiment, the RF-absorbing foam can be fabricated from open-cell (also referred to as "reticulated") polyurethane foam lightly loaded with carbon. Commercially available carbon-loaded RF-absorbing foams are recognized in the industry on a grading scale ranging from "lightly loaded" to "heavily loaded," where more heavily carbon-loaded foams exhibit higher levels of RF attenuation. On the other hand, more heavily carbon-loaded foams exhibit higher impedance levels, increasing the level of RF reflection, which generates PIM. Even though a lightly loaded RF-absorbing foam exhibits lower reflections than heavily loaded absorber, tests have shown that the reflection level of even lightly loaded foam is still too high when placed in direct contact with the front surface of the antenna radome.

At prevailing cellular carrier frequencies, such as 1,900 MHZ considered generally representative for this purpose, moving the RF-absorbing foam a short distance, such as two-inches (5 cm) away from the antenna surface, improves the PIM performance significantly. To achieve this spacing, a non-absorbing spacer layer, such as open-cell polyurethane foam, is added to the pad on the side facing the antenna. The non-absorbing foam spacer prevents the lightly loaded RF-absorbing foam from getting too close to the surface of the antenna radome, thus limiting the level of PIM that would otherwise be produced by the RF-absorbing layer. In addition, the RF-absorbing foam tends to become heated by absorption of the RF energy transmitted by the antenna. It has been found that this amount of non-absorbing spacer provides adequate separation between the antenna and the RF-absorbing foam to prevent damage to the antenna radome from overheating.

Standard-sized RF-absorbing panel sections can be 24-inches (61 cm) wide by 24-inches (61 cm) tall, with 3 to 4 inches (7.6 to 10.2 cm) over-all thickness including the non-absorbing foam spacer. Shorter standard-sized pads are not considered advantageous as any extra panel assembly height over coextensive with the face of the antenna under evaluation will not adversely impact the PIM tests. Any extra assembly cover can be rolled up and secured with straps. The number of RF-absorber sections attached to each other can be reduced or increased as needed so long as the RF-active layers are at least coextensive with the face of antenna under evaluation. Typical cellular base station antennas range from 24-inches to 96-inches tall. As a result, installing one to four 24-inch sections will typically be sufficient for most applications.

The RF-absorber sections can be attached to the blanket using plastic buckles, hook & loop (Velcro®) fasteners, or a combination of both. To minimize PIM, it is important that no metal fasteners be used to attach the pad sections to the blanket. To secure the absorber assembly to the site antenna, sewn loops and straps, for example of nylon webbing, are provided at the top and along the elongated lateral sides of the blanket, which ate typically oriented vertically. In a representative embodiment, a nylon strap is installed through the top loops of the blanket and around the antenna mounting pipe. This supports the weight of the absorber system. Connecting straps, such as Bungee cords or ratchet tie-down straps, can be looped behind the antenna and connected to the sewn loops on the sides of the absorber assembly cover blanket. This keeps the RF-active layers held securely to antenna evaluation, with the leading face of non-absorbing layer against the face of the antenna the front face of the antenna radome, which prevents movement due to wind. In addition, the RF-absorber layers are sufficiently flexible to be contoured to the generally gradual shape of the front face of the antenna radome, such as a radome face that curves horizontally.

Due to mechanical tolerances, it is possible for absorber pads to have open spaces between pads after installation to the blanket. If the RF-shield layer is housed inside the absorber pad, these spaces could allow RF signals to pass through and illuminate PIM sources in front of the antenna. Embedding an RF-shield layer coextensive with the face of the assembly cover eliminates these potential gaps in the RF-shield, but gaps may still exist between sections of the RF-absorbing pads. As a result, high reflection can occur at these gaps in the RF-absorber resulting in higher VSWR and higher illumination of rear PIM sources. To mitigate this issue, nylon edge straps are sewn onto the sedges of the absorber pads providing loops to synch the pads together to eliminate gaps, as shown in FIG. 5B. For example, nylon cable ties can be used to secure the pads sections together to prevent gaps from occurring between the RF-absorbing sections, which also prevents gaps from occurring between the RF-shield layers in embodiments housing the RF-shields within the section covers.

Figures 9, 10:
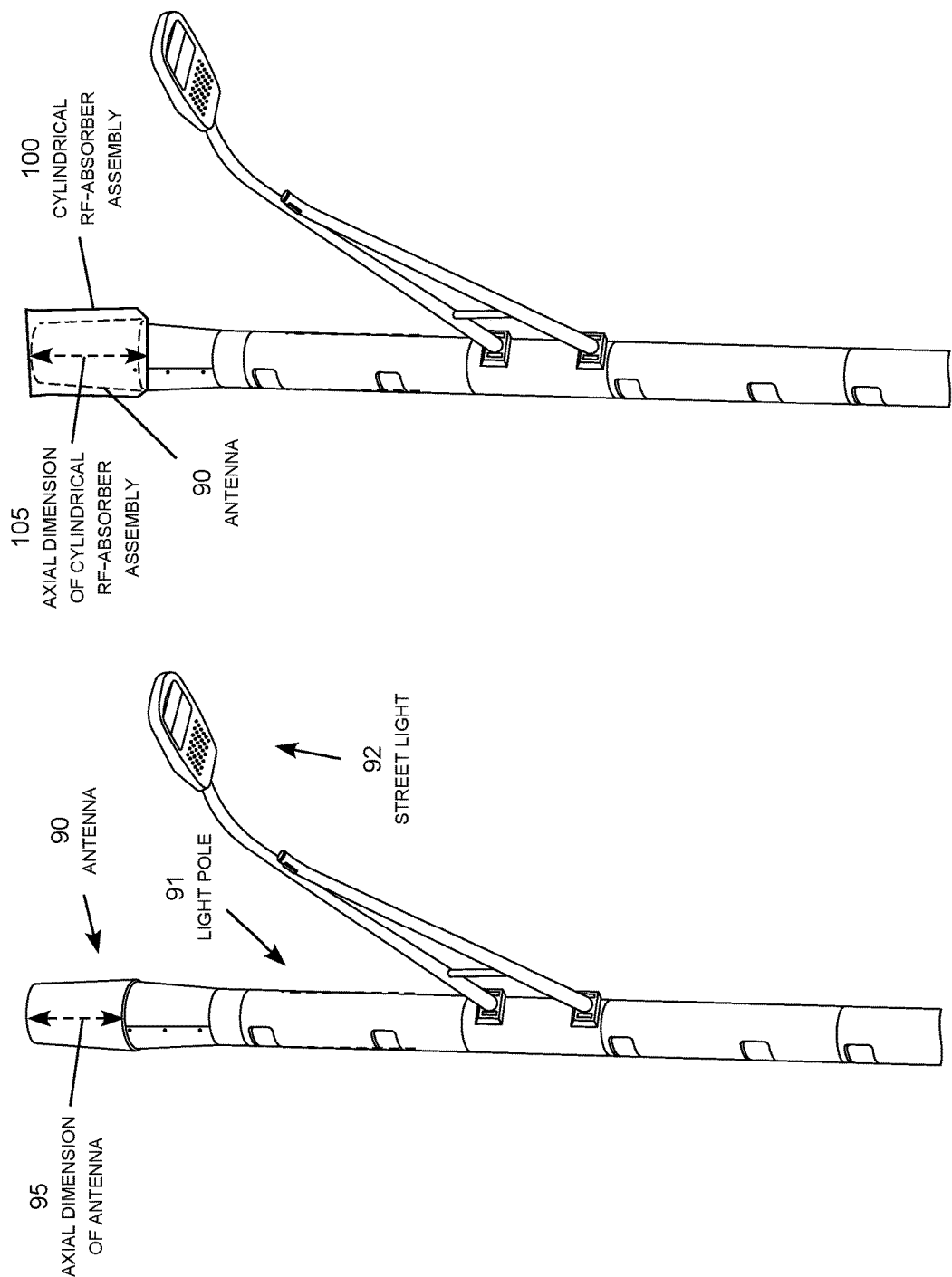
FIG. 9 (prior art) is a front view of a multi-directional antenna mounted on a light pole.
FIG. 10 a front view of a cylindrical RF-absorber assembly installed over the multi-directional antenna.

Another illustrative embodiment is an cylindrical RF-absorber system configured to be placed over multi-directional antennas, such as omni-directional antennas and multi-directional panel antenna arrays, as shown in FIGS. 10 through 16. Multi-directional antennas, represented by the light-pole mounted antenna shown in FIGS. 9 and 10, are typically deployed on small cell sites designed to provide coverage over a limited area. These antennas are typically cylindrical in shape and range from 6-inches (15.3 cm) to 18-inches (45.7 cm) in diameter. For this type of antenna, there are no "front" or "back" sides. Energy from the antenna radiates in all directions around the antenna.

Figure 11:
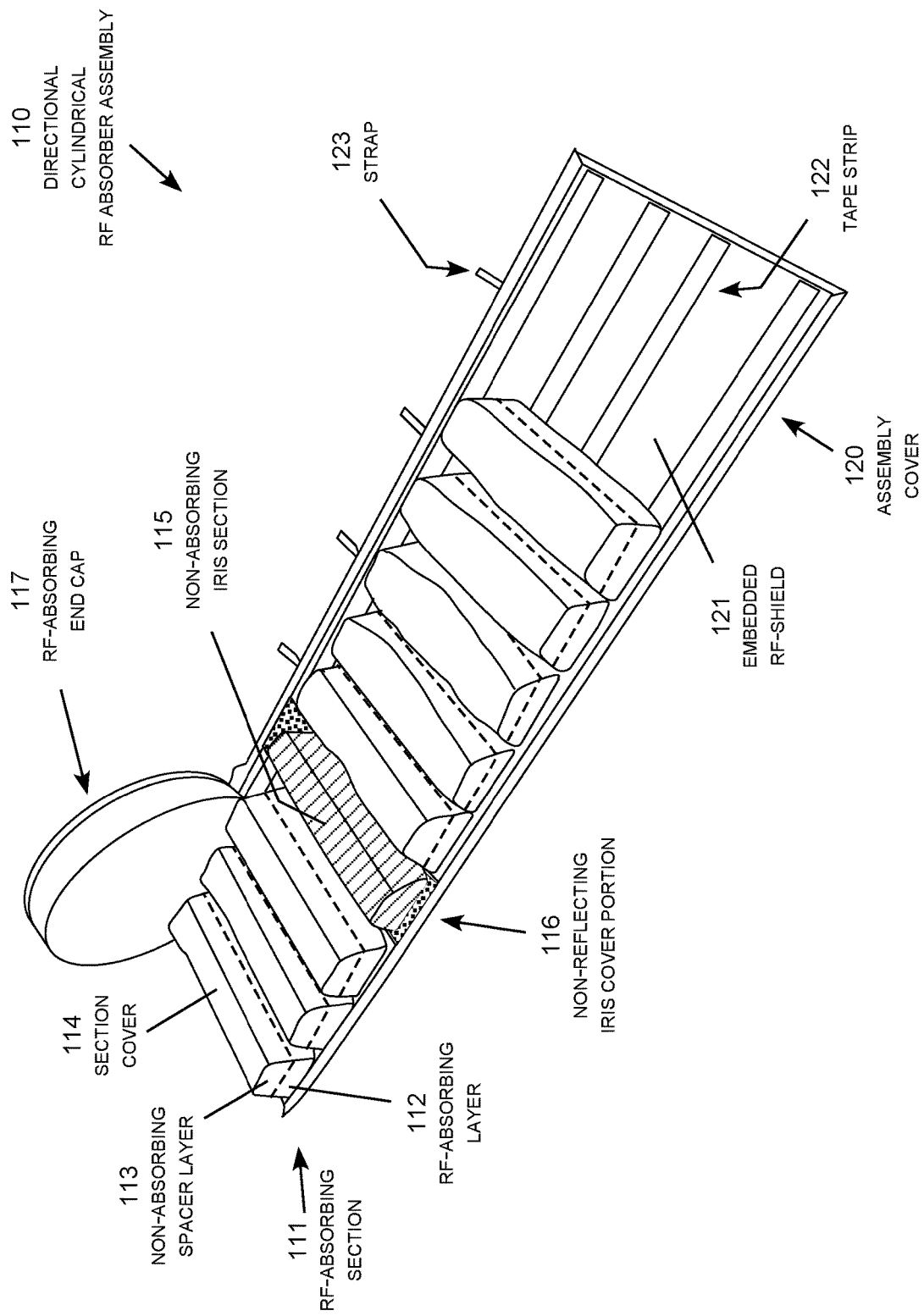
FIG. 11 is a conceptual illustration showing a cylindrical RF-absorber assembly.
Figure 12:
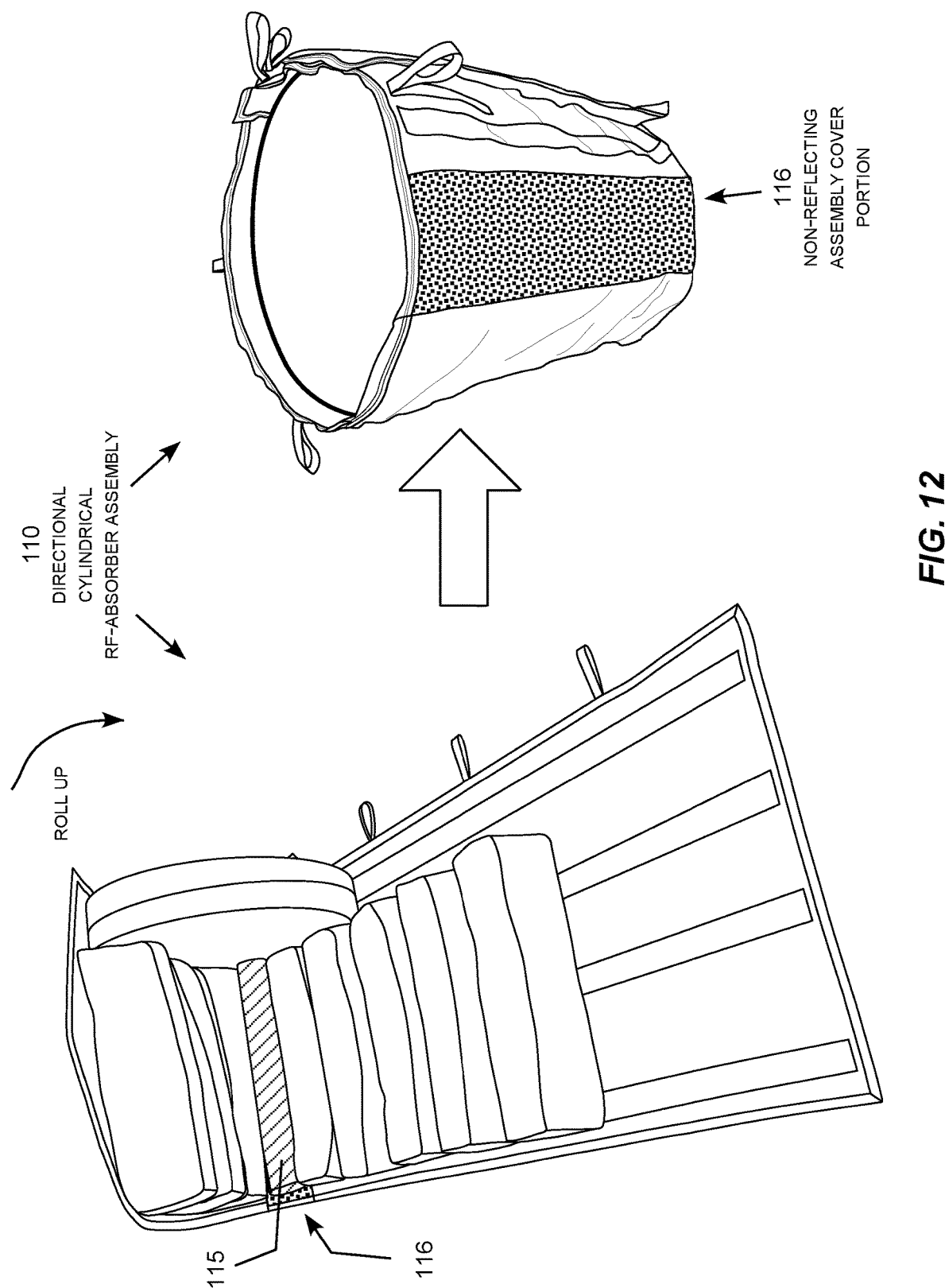
FIG. 12 is a conceptual illustration showing roll-up assembly of the cylindrical RF-absorber assembly.
Figure 13:
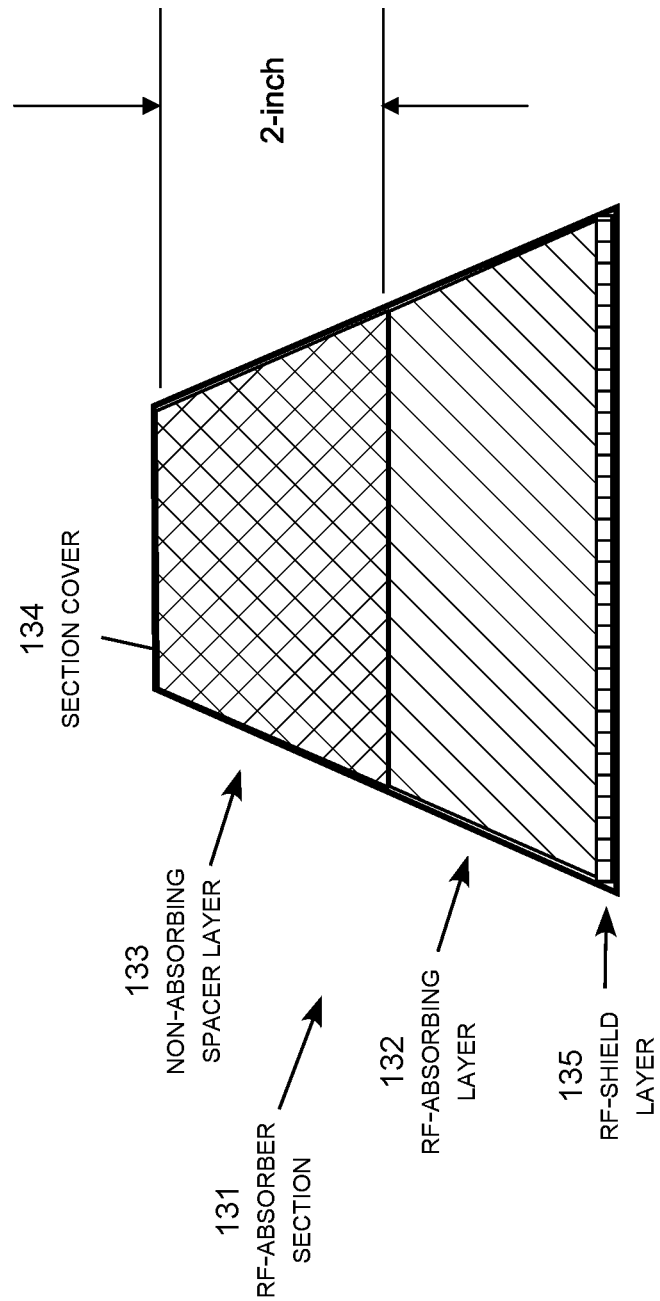
FIG. 13 is a sectional view of a tapered RF-absorbing foam section of the cylindrical RF-absorber assembly.
Figure 14A:
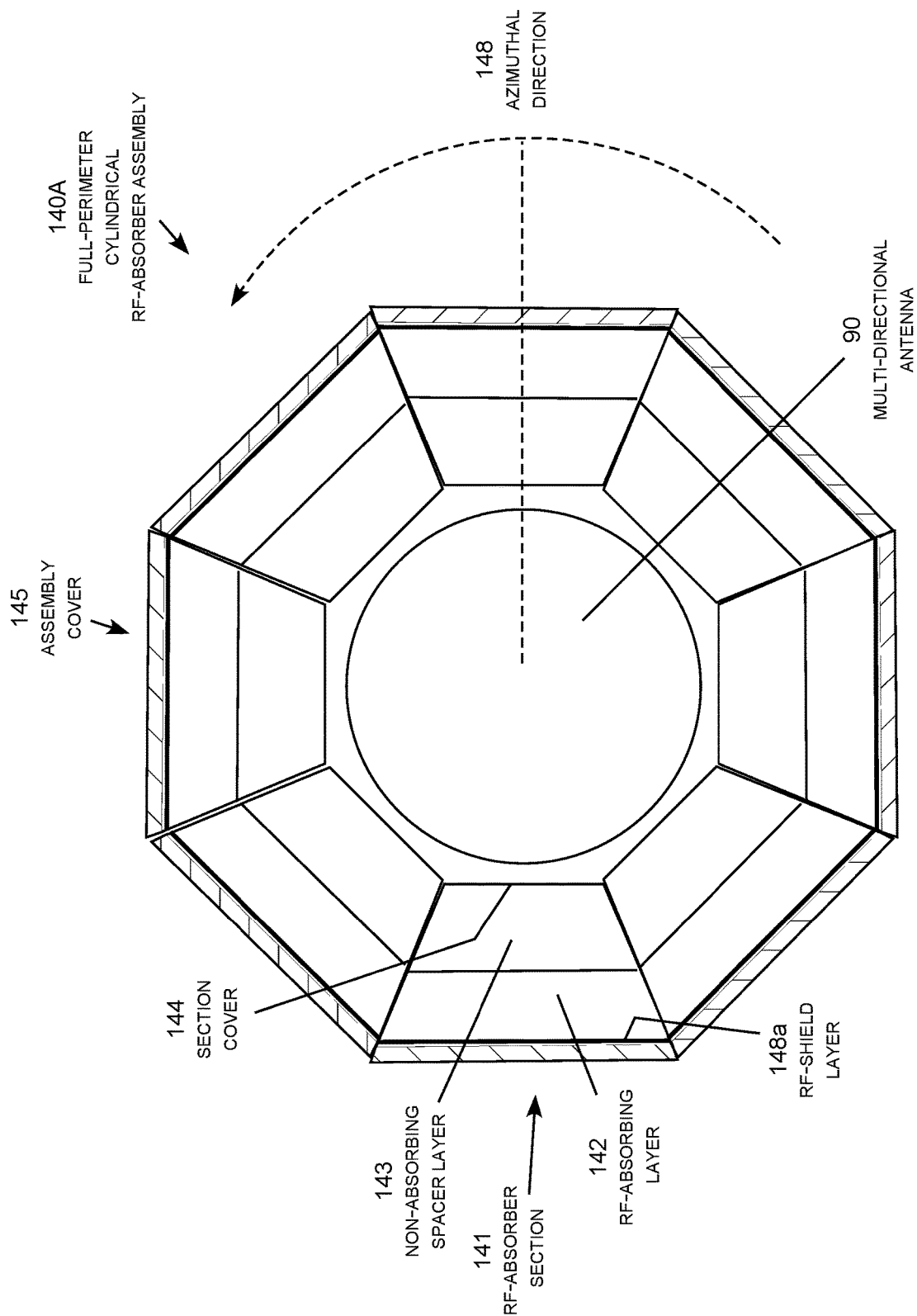
FIG. 14A is a sectional view of a full-perimeter cylindrical RF-absorber assembly.
Figure 14B:
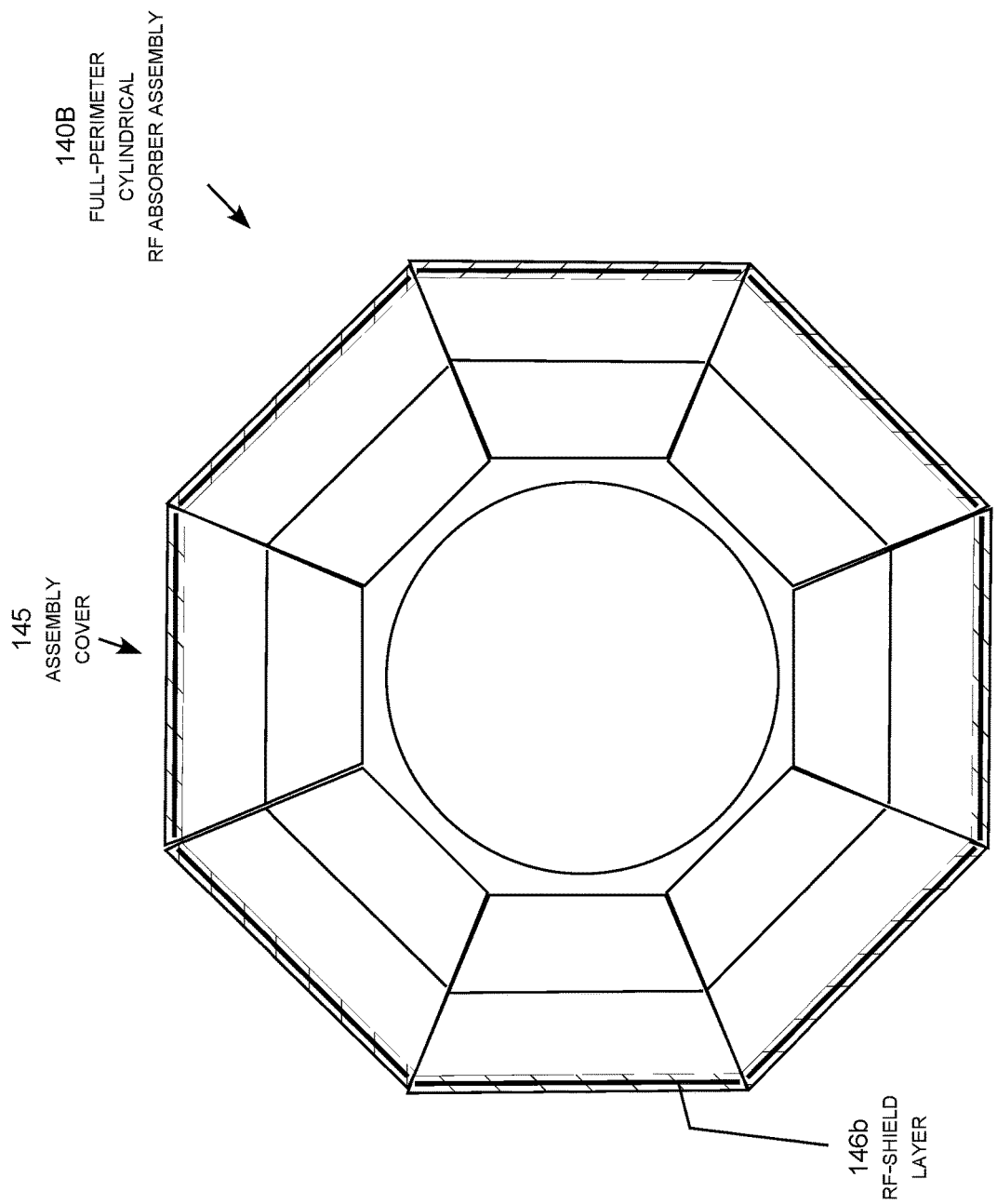
FIG. 14B is a sectional view of an alternative full-perimeter cylindrical RF-absorber assembly.

Absorber systems for this type of antenna can likewise be generally cylindrical in shape. This is achieved by replacing the rectangular pads used with panel antennas with tapered absorber pads as shown in FIGS. 11-12. FIG. 13 shows a sectional views of an individual tapered pad. The assembly can then be rolled-up to form a cylindrical shape with the blanket holding the multiple angular shaped pads in position as shown in FIGS. 11-16. More or fewer angular pads can be installed to vary the overall diameter of the cylindrical absorber assembly. A disc-shaped RF-absorber end cap is attached to the top end of the side-wall assembly cover using hook & loop fasteners to form block energy radiating out the top of the antenna. FIGS. 14A-14B shows sectional views of alternative representative embodiments of the cylindrical side-walls.

In order to provide directional PIM-hunting functionality, one RF-absorptive angular pad can be replaced with a pad containing no RF-absorber to avoid absorbing the RF beam transmitted by the antenna, as shown in FIGS. 15-16. The assembly side-wall cover also includes a non-reflecting or openable section at the iris to avoid reflecting the RF beam. This creates a window, or openable window, forming an iris without any RF attenuating or reflecting material. When this directional cylindrical RF-absorber is placed over the top of an omni-directional antenna, it can be manually rotated 360-degrees in an azimuthal direction about the axial, typically vertical dimension. The maximum PIM will be measured when the iris is positioned between the antenna and the PIM source. Rather than needing to search all directions around the antenna for the PIM source, the technician can the focus directly on a single direction.

Figure 7A:
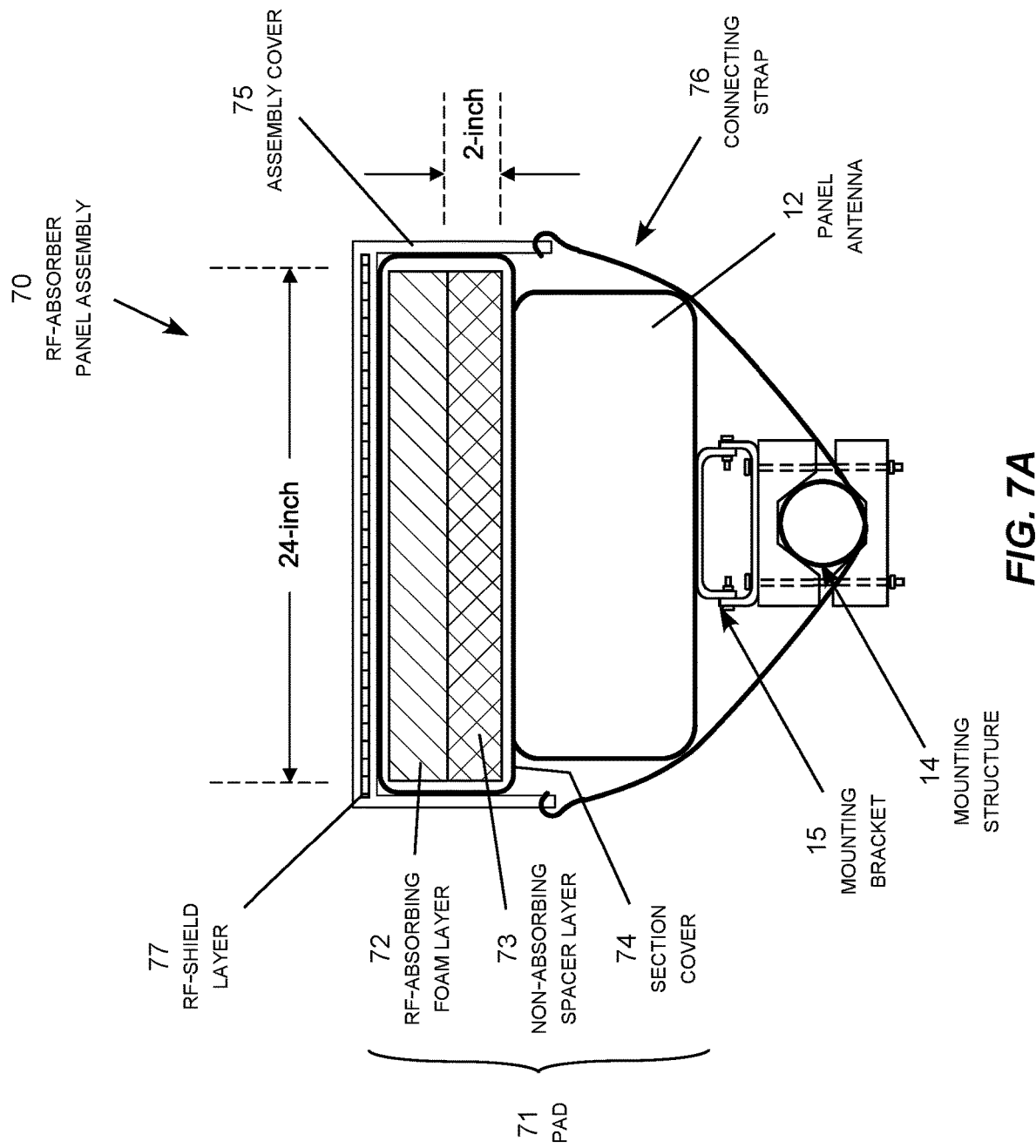
FIG. 7A is a sectional view a first type of RF-absorber panel assembly attached to a panel antenna.
Figure 7B:
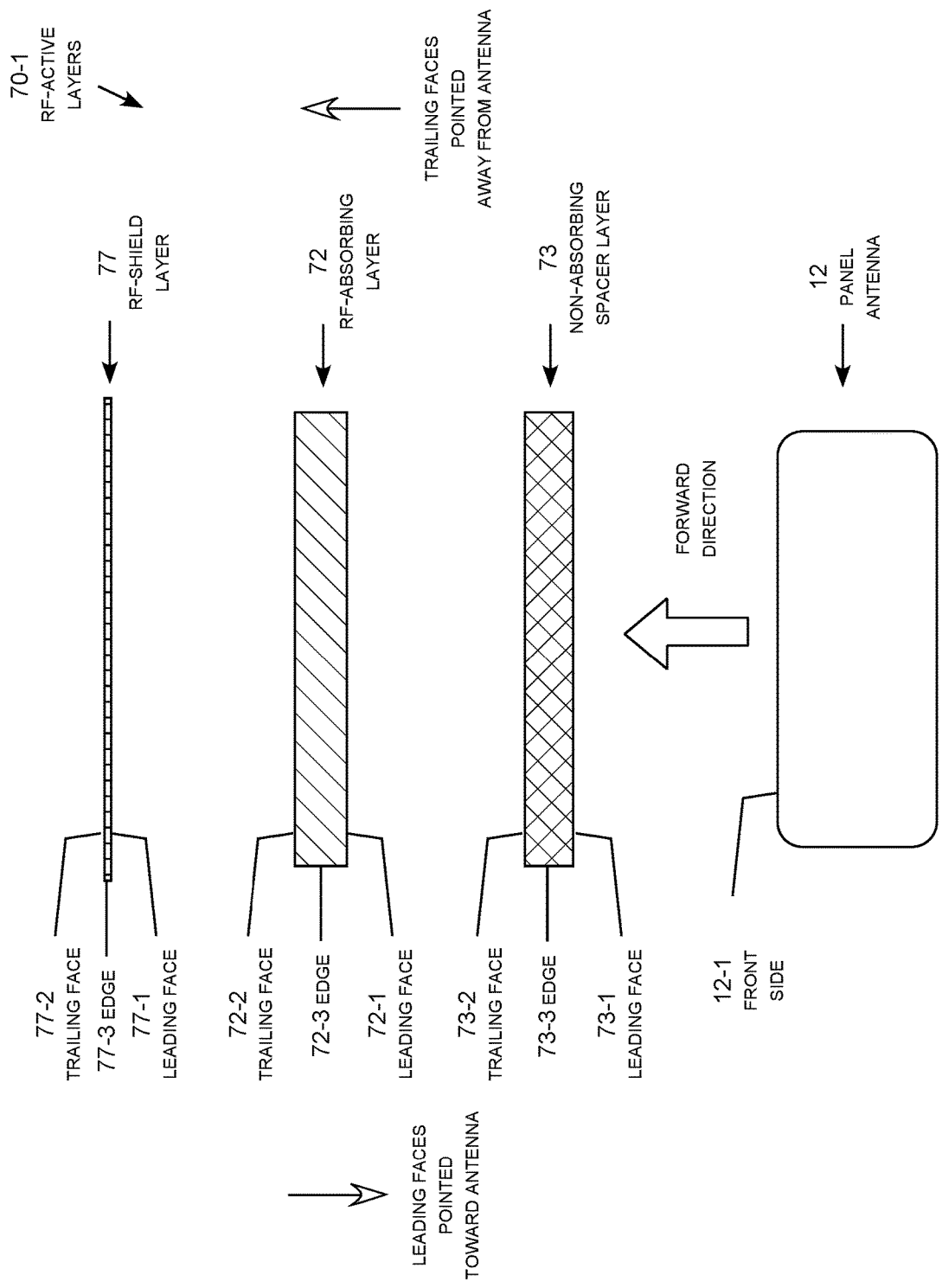
FIG. 7B is an exploded view of the RF-active layers in RF-absorber assemblies.
Figure 8:
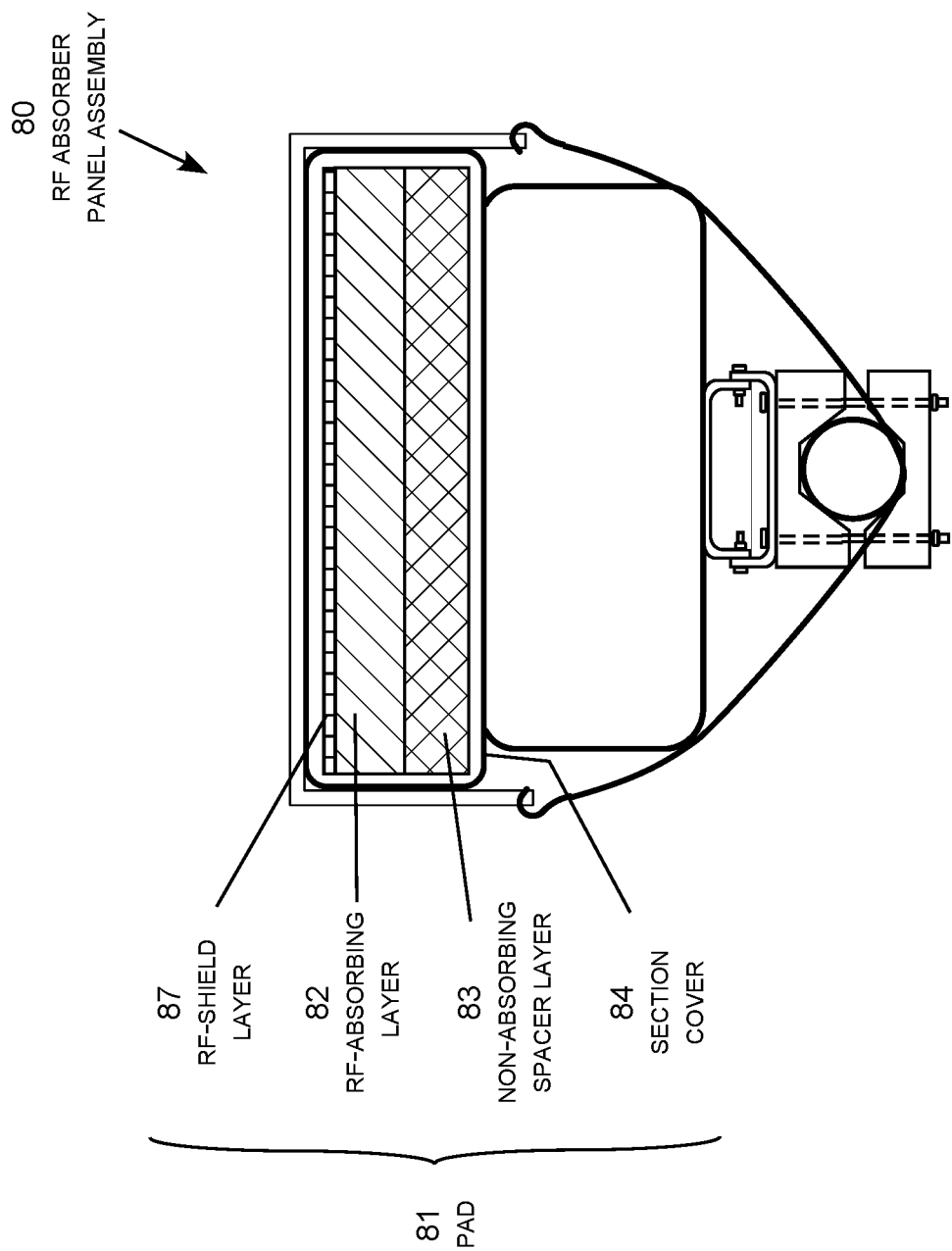
FIG. 8 is a sectional view a second type of RF-absorber panel assembly attached to a panel antenna.

FIG. 7A shows an RF-absorber panel assembly with the RF-shield layer embedded in the panel cover. FIG. 7B is an exploded view of the RF-active layers in the RF-absorber assemblies. FIG. 8 shows an alternative embodiment with the RF-shield layer embedded in the sections pads. FIG. 17 shows full-perimeter RF-absorbing panel antenna assembly with a front RF-absorbing panel, a rear RF-absorbing panel, and RF-shield layering side blankets. FIG. 18 illustrates a PIM hunting procedure for the full-perimeter RF-absorbing panel antenna that is not configured to rotate with respect to the antenna under evaluation. It will be appreciated, that the principles of the invention may be used to construct various panel assembly embodiments with one or more aperture in one or more panel assemblies as a matter of design choice. For example, a panel assembly with an aperture adjacent to the front face of a panel antenna may be constructed with sufficient clearance, or with a turntable feature, to allow the assembly to rotate with respect to the antenna. In these embodiments, the apertures may be configured to for selectively opening in degrees to allow the aperture to be opened to a produce different width or radius apertures.

Turning to the figures, reference will now be made in detail to specific representative embodiments of the invention. In general, the same or similar reference numerals are used in the drawings and the description to refer to the same or like parts or steps. The drawings are in simplified form and are not to precise scale unless specifically indicated. The words "couple," "adjacent" and similar terms do not necessarily denote direct and immediate connections, but also include connections through intermediate elements or devices. Certain descriptors, such "first" and "second," "top and bottom," "upper" and "lower," "inner" and "outer," "leading" and "trailing," "vertical" and "horizontal" or similar relative terms may be employed to differentiate structures from each other in representative embodiments shown in the figures. These descriptors are utilized as a matter of descriptive convenience and are not employed to implicitly limit the invention to any particular position or orientation.

It will be understood that specific embodiments may include a variety of features and options in different combinations, as may be desired by different users. Practicing the invention does not require utilization of all, or any particular combination, of these specific features or options. The specific techniques and structures for implementing particular embodiments of the invention and accomplishing the associated advantages will become apparent from the following detailed description of the embodiments and the appended drawings and claims.

Figure 3:
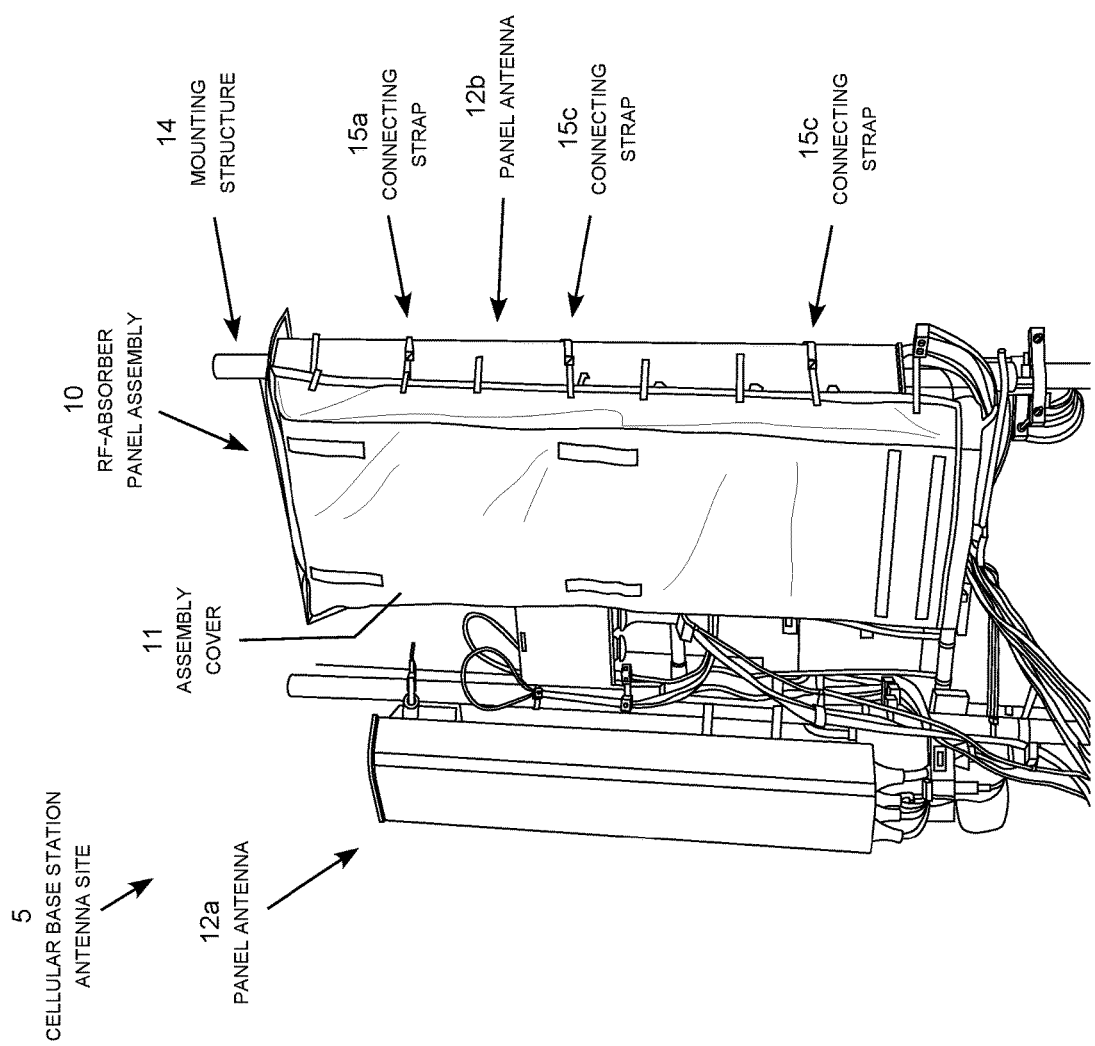
FIG. 3 is perspective view of a cellular antenna site including an RF-absorber panel assembly covering one of the panel antennas.

FIG. 3 is perspective view of a cellular base station antenna site including two panel antennas 12a and 12b. An RF-absorber panel assembly 10 covers the panel antenna 12b. In this particular embodiment, the RF-absorber panel assembly 10 only covers the front (i.e., main beam emitting face) of the panel antenna 12b. During PIM hunting, a technician installs the RF-absorber panel assembly 10 on the front of the antenna to determine whether a PIM source is located in the forward direction from the antenna. More specifically, the technician measures the PIM before temporarily installing the RF-absorber panel assembly 10 on the antenna 12b, then installs the panel assembly, and measures the PIM again. If the PIM level goes down significantly after installing the RF-absorber panel assembly 10, the technician knows to search in front of the antenna 12b for the PIM source. This single piece of information can significantly reduce the amount of time the technician will have to spend searching for the PIM source.

The RF-absorber panel assembly 10 includes a number of RF-absorbing sections located within an assembly cover 11. This particular figure shows the mounting structure 14, in this embodiment a mast supporting the panel antennas 12b. The front (I.e., main beam emitting) face of the panel antenna 12b is covered by the RF-absorber panel assembly 10, which is at least coextensive with the front face of the antenna. The RF-absorber panel assembly 10 is temporarily attached to the antenna mounting structure with a number of connecting straps 15a-15c that attach to opposing sides of the assembly cover 11 and wrap around the mounting structure. Additional or fewer straps may be used in view of the length of the panel and wind conditions at the time of use.

In this specific example, the mounting structure 14 is a vertical mast and the connecting straps 15a-15c may be bungee cords, ratchet straps, or other suitable tie-downs. Typically an upper tether strap extending from the top of the assembly cover 11, which is not illustrated in this view, is tightly wrapped around and synched to the mounting structure above the RF-absorber panel assembly 10 to bear most of the weight of the RF-panel absorber assembly. The additional connecting straps 15a-15c along the vertical length of the assembly further support and stabilize the assembly against the wind.

Figure 4:
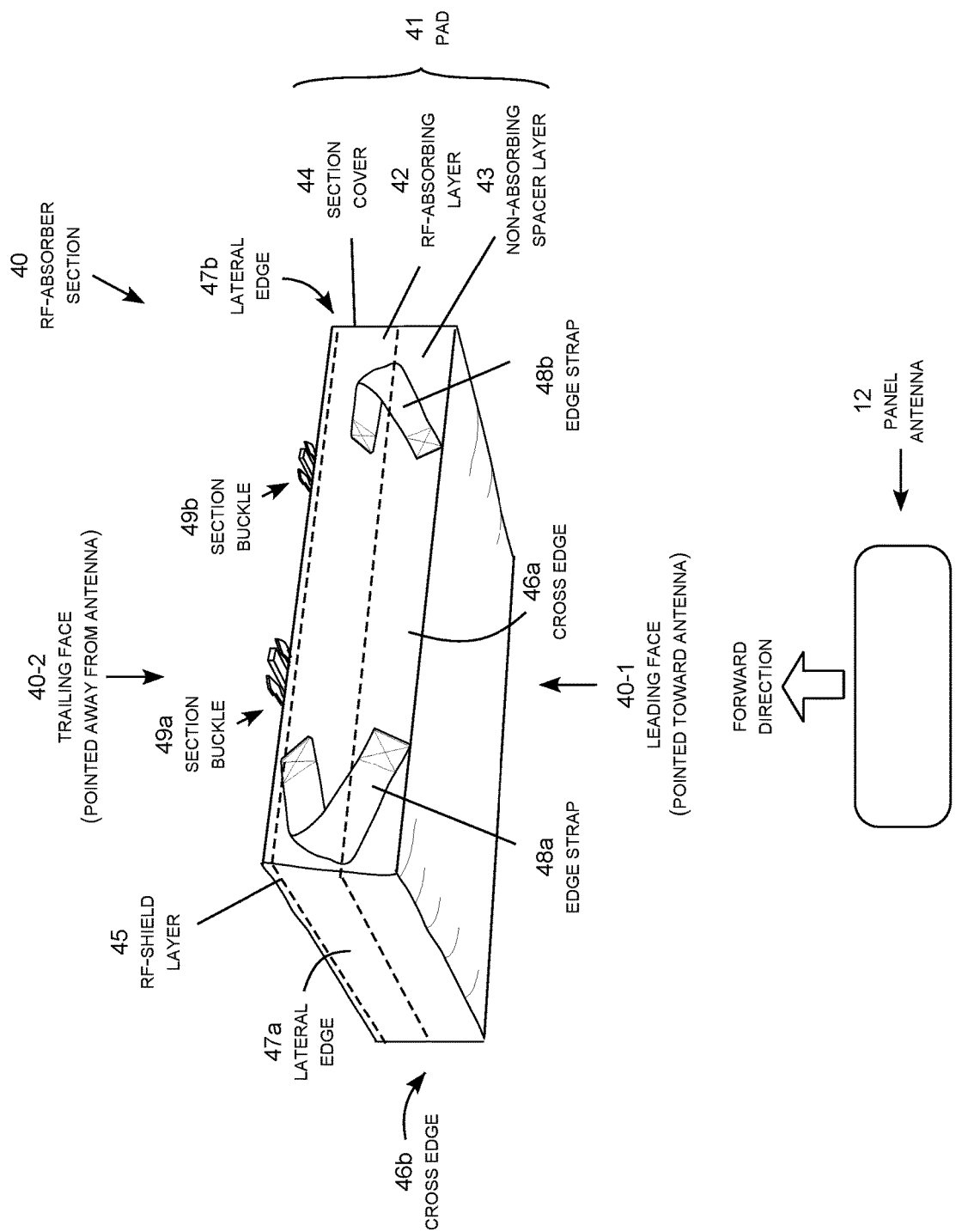
FIG. 4 is a perspective view of an RF-absorber section.

FIG. 4 is a perspective view of a representative RF-absorber section 40. The section 40 includes a pad 41, which includes an RF-absorbing layer 42, and a non-absorbing spacer layer 43, housed inside a section cover 44. The RF-absorbing layer 42 and the non-absorbing spacer layer 43 are co-extensive and positioned adjacent to each other. As an option, an RF-shield layer 45 may also be included inside the section cover 44 on the opposing side of the RF-absorbing layer 42. When housed in the section cover 44, the RF-shield layer 45 is also co-extensive with the foam layers and positioned so that the RF-absorbing layer 42 is positioned between the RF-shield layer 45 (further away from the antenna under evaluation) and the non-absorbing layer facing 43 (closer to away from the antenna under evaluation).

To establish relative directions for descriptive convention, when the RF-absorber section 40 is installed on the panel antenna 12 in a representative operational configuration shown in FIG. 3, the panel antenna 12 is oriented vertically and transmits a horizontal main beam in a forward direction toward the RF-absorber section. The RF-absorber section 40 defines two substantially flat faces with relatively larger cross-sections spaced apart by four substantially flat edges with relatively smaller (narrower or thinner) cross-sections. To further define the convention, a leading face 40-1 is closer and pointed toward the antenna 12, while a trailing face 40-2 is further away and pointed away from the antenna. A pair of cross edges 46a and 46b are oriented horizontally and spaced apart vertically, while a pair of lateral edges 47a and 47b are oriented vertically and spaced apart horizontally. The forward direction from the antenna 12 is generally aligned with the edges direction 46a-46b and 47a and 47b, which is also referred to as "transverse" to the RF-absorber section 40.

In addition, each "face" defines a "normal" or "pointing" direction orthogonal to and pointed away from the face. The leading face 40-1 of the RF-absorber section 40 is referred to as "oriented" or "pointed" toward the antenna 12 when the normal direction from the face is generally opposing and aligned with the forward direction within about 25°, which corresponds to about 90% exposure of the leading face 40-1 to the forward direction. Similarly, the trailing face 40-2 is referred to as "oriented" or "pointed" away the antenna 12 when the normal direction from the face is in the same general direction and aligned with the forward direction from the antenna 12 within about 25°, which corresponds to about 90% exposure of the trailing face 40-2 to the forward direction from the antenna. The directions selected for the descriptive convention and merely illustrative, as a panel antenna or RF-absorber panel assembly may be placed in any desired edge position and pointing direction.

Figure 6:
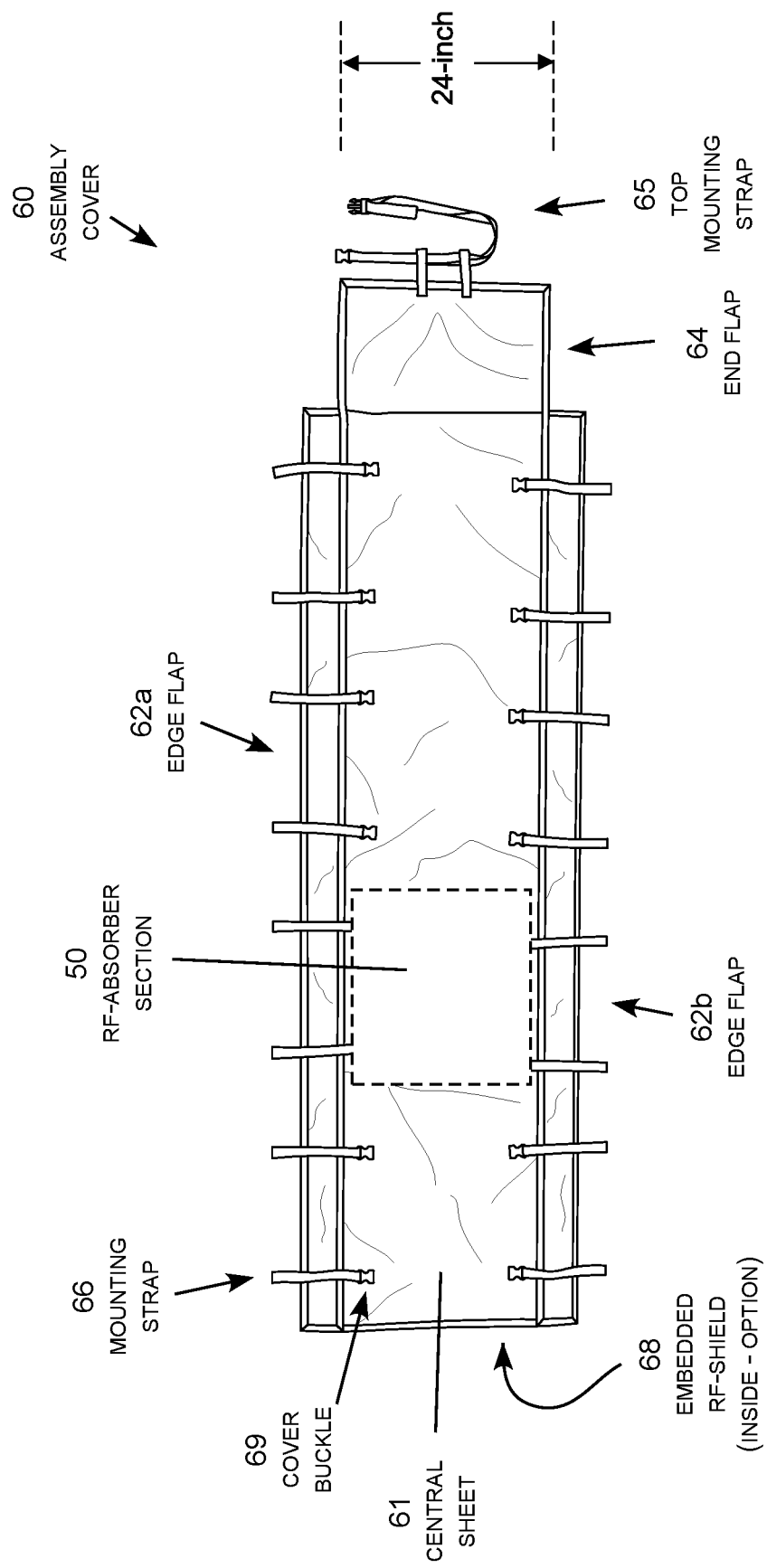
FIG. 6 is top view of an assembly cover for an RF-absorber panel assembly.

Each cross edge 46a and 46b carries a pair of edge straps represented by the edge straps 48a and 48b illustrated in FIG. 4. In addition, the trailing face 40-2 of the RF-absorber section 40 includes four section buckles, represented by the section buckles 49a and 49b illustrated in this view, which are attached by way of buckle straps attached (e.g., sewn) to the section cover 44. These section buckles are used to removably attach the RF-absorber section to the assembly cover 60, as shown in FIG. 6. More specifically, each section buckle removably engages with a respective cover buckle, represented by the enumerated cover buckle 69 shown in FIG. 6, which are similarly attached the assembly cover by way of buckle straps attached (e.g., sewn) to the section cover 44. Thus, it will be appreciated that four section buckles and respective buckle straps removably secure the RF-absorber section 40, shown in FIG. 4, to the assembly cover 60, shown in FIG. 6, by way of buckles and associated buckle straps.

In a specific embodiment, the RF-absorbing layer 42 may be a two-inch (5 cm) thick, 24-inch (61 cm) wide by 24-inch (61 cm) tall, open-cell, lightly carbon-loaded polyurethane foam layer. The non-absorbing layer facing 43 may be a similarly sized open-cell polyurethane foam layer without carbon loading. The RF-shield layer 45 may be a coextensive metal foil layer (e.g., aluminum foil 6 mil or thinner), which may be embedded in a panel section, an assembly cover, or otherwise incorporated into the assembly. As other alternatives, a metallic RF-shield layer may sprayed-on or adhered to a carrier layer, such as mylar or another suitable polymer sheet, to add strength and mitigate wrinkling. The section cover 44 may be, for example, a 20 mil or thicker vinyl or other suitably rugged fibric, or two 10 mil or thicker fabric layers on opposing sides of an RF-shield layer. The edge straps and buckle straps may be nylon webbing sewn to the section cover or the assembly cover. The buckles may be high strength plastic buckles fabricated from a high strength plastic, such as high-density polyethylene ("HDPE"), polycarbonate, or other suitable plastic. Similar heavy duty buckles and straps are commonly used on luggage, tie-downs, and other strap applications.

FIG. 5A is a perspective view of several RF-absorber sections 50a-50n assembled edge-to-edge to create an RF-absorber panel 52. Each section includes four edge straps, represented by the enumerated edge strap 58, used to removably tie adjacent sections of the RF-absorber panel 52 to each other. Each section also includes four section buckles, represented by the enumerated section buckle 59, used to removably attach the RF-absorber section to the assembly cover 60, as shown in FIG. 6. That is, each section buckle 59, shown in FIG. 5, removably engages with a respective cover buckle 69, shown in FIG. 6, to attach a desired number of sections 50a-50n to the assembly cover 60 to create a panel assembly 30, as shown in FIG. 3.

FIG. 5B is a detail illustration showing representative edge straps 58a and 58b on adjacent RF-absorber sections 50a and 50b removably joined together with a fastener 55, such as a cable tie, to avoid spaces between the adjacent sections. The detail illustration also shows section buckles represented by the enumerated section buckle 57.

FIG. 6 is top view of an assembly cover 60 for an RF-absorber panel assembly with a representative RF-absorber section 50 shown in dashed lines. The assembly cover 60 includes a central sheet 61 wide enough to cover the face of the RF-absorber section 40 and long enough to cover a desired number of sections in the RF-absorber panel 52, as shown in FIG. 6. For example, one to four RF-absorber sections can be utilized for to cover panel antennas with conventional heights. The assembly cover 60 also includes two edge flaps 62a and 62b that are sufficiently wide to cover the lateral edges of the RF-absorber section 50. Referring also to FIG. 7, the assembly cover 60 includes top flap 64 wide enough to cover the top edge of the RF-absorber section 50, a typical panel antenna 12, a typical mounting structure 14, and a typical mounting bracket 15, such as a tilt bracket attaching the panel antenna to the antenna mounting structure. A top mounting strap 65 attached to the end flap 64 is long enough to wrap around and synch to the antenna mounting structure 14 to help support the weight of the RF-absorber assembly. For example, the top mounting strap 65 may include a Velcro loop with a ratchet strap to securely synch the mounting strap to the antenna mounting structure.

The assembly cover 60 also includes a number of mounting straps, represented by the enumerated mounting strap 66. Each mounting strap 66 may be contiguous with a respective cover buckle, represented by the enumerated cover buckle 69, and associated buckle strap. Each mounting strap also includes a loop or length of strap with an eyelet configured to receive a connecting strap, represented by the connecting straps 15a-15c shown in FIG. 3 (see also the connecting strap 76 enumerated in FIG. 7A). This particular example assembly cover 60 includes an embedded RF-shield layer 68, such as a metal foil layer adhered between two outer layers of fabric forming the assembly cover. Embedding the metal foil layer between two outer layers of rugged fabric protects the RF-shield layer and mitigates wrinkling to maintain the desired low-PIM characteristic of the RF-shield layer.

In a representative embodiment, the assembly cover 60 is shown substantially to scale with the central sheet 61 24-inches (61 cm) wide. Alternative assembly cover 60 embodiments may be fabricated from a 20 mil fabric without an embedded RF-shield, or two layers of 10 mil fabric with an embedded RF-shield. The substrate fabric may be vinyl, polyester, or another suitably rugged fabric. For example, Sunbrella® fabricates a variety of commercially fabrics used to manufacture outdoor awnings found to be suitable for this purpose. The mounting straps and end straps may be nylon webbing sewn to the assembly and section covers, while the buckles may be high strength plastic buckles fabricated from a high strength plastic, such as HDPE or polycarbonate. Similar commercially available buckles are used for heavy duty luggage, tent tie-downs, ratchet straps, and other similar applications.

FIG. 7A is a sectional view of a first type of RF-absorber panel assembly 70 attached to a panel antenna 12. The RF-absorber panel assembly 70 includes a pad 71 formed from an RF-absorbing layer 72 positioned adjacent to a non-absorbing layer 73 inside a section cover 74. The pad 71 is surrounded on three sides by an assembly cover 75, which is removably attached to the antenna mounting structure 14 by a connecting strap 76 is illustrated as a bungee cord in this example embodiment. An RF-shield layer 77 is embedded in the assembly cover 75, as described above with reference to FIG. 6. In this representative embodiment, the faces of the pad 71 and the RF-shield layer 77 are 24-inches (61 cm) wide. Each pad section may also be 24-inches (51 cm) tall. The RF-absorbing layer 72 and the non-absorbing layer 73 are 2-inches (5 cm) thick, resulting in sections with 24-inch (61 cm) square faces, and 4-inches (10 cm) thick edges. The non-absorbing layer 73 is positioned closest to the antenna 12 with the RF-absorbing layer 72 positioned between the RF-shield layer 77 and the non-absorbing layer 73.

FIG. 7B is an exploded view of the RF-active layers 70-1 of the absorber panel assemblies, which is common to the various assemblies described in the disclosure. This figure defines certain faces and directions for descriptive convenience. The panel antenna 12 emits a downlink main beam propagating away from the antenna in a forward direction, which may also be referred to as "transverse" to a panel facing the main beam. A panel generally has substantially flat, relatively larger surface area sides referred to as "faces," and substantially flat, relatively smaller surface area sides referred to as "edges." Each side defines a "normal" or "pointing" direction orthogonal to and pointed away from that side. A panel face is "oriented" or "pointed" toward the antenna 112 when the normal direction from the face is opposing and aligned with the forward (i.e., main bream emitting) direction within about 25°, which corresponds to about 90% exposure of the face to the forward direction. Using this nomenclature, the non-absorbing spacer layer 73 has a leading face 73-1 pointed toward the antenna 12 and a trailing face 73-2 pointed away from antenna, which is typically placed against the front radome of the antenna 12. The RF-absorbing layer 72 has a leading face 72-1 pointed toward the antenna 12 and a trailing face 72-2 pointed away from the antenna. The RF-shield layer 77 has a leading face 77-1 pointed toward the antenna 12 and a trailing face 77-2 away from the antenna.

Accordingly, the RF-active layers 70-1 of the RF-absorber panel assembly 70 arranged in the forward direction from the antenna 12 include:
(a) a non-absorbing spacer layer 73 with:
   (i) a leading face 73-1 pointed toward and adjacent to the antenna,
   (ii) a trailing face 73-2 pointed away from antenna;
(b) an RF-absorbing layer 72 with:
   (i) a leading face 72-1 adjacent to the trailing face of the non-absorbing spacer layer 73 and pointed toward the antenna 12, and
   (ii) a trailing face 72-2 pointed away from the antenna; and
(c) an RF-shield layer 77 with:
   (i) a leading face 77-1 adjacent to the trailing face of the RF-absorbing layer 72 pointed toward the antenna 12, and
   (ii) a trailing face 77-2 pointed away from the antenna.

In addition, the non-absorbing spacer layer 73 includes four edges represented by the enumerated edge 73-3, transverse to the leading and trailing faces 73-1 and 73-2, and aligned with the forward direction. The RF-absorbing layer 72 includes four edges represented by the enumerated edge 72-3, transverse to leading and trailing faces 72-1 and 72-2, and aligned with the forward direction. Similarly, the RF-shield layer 77 includes four edges represented by the enumerated edge 77-3, transverse to leading and trailing faces 77-1 and 77-2, and aligned with the forward direction. The assembly cover 75 wraps around the trailing face 77-2 of the RF-shield layer 77 and two opposing (vertically oriented in this example) edges of all three RF-active layers 70-1. The connecting straps represented by the enumerated connecting strap 76 attaches to opposing lateral (vertically oriented in this example) sides of the assembly cover 75. The connecting strap 76 also wraps around the mounting structure 14 to secure the RF-absorber panel assembly 70 to the mounting structure 14. The connecting strap 76 also secures the leading face 73-1 of the non-absorbing spacer layer 73 adjacent to the radome at the front side of the antenna 12-1. This also secures the trailing face 73-2 of the non-absorbing spacer layer 73 adjacent to the leading face 72-1 of the RF-absorbing layer 72. This similarly secures the trailing face 72-3 of the RF-absorbing layer 73 adjacent to the leading face 77-1 of the RF-shield layer 77, while also securing the trailing face 77-3 of the RF-shield layer 77 adjacent to the assembly cover 75.

FIG. 8 is a sectional view of a second type of RF-absorber panel assembly 80, which is similar to the RF-absorber panel assembly 70 shown in FIG. 7. FIG. 8 illustrates an alternative embodiment in which the RF-shield layer 77 embedded in the assembly cover 75 in the RF-absorber panel assembly 70 shown in FIG. 7, has been replaced by an RF-shield layer 87 housed inside the section cover 84 of the RF-absorber panel assembly 80 shown in FIG. 8. Accordingly, the pad 81 in this embodiment includes the RF-absorbing layer 82, the non-absorbing spacer layer 83, and the section cover 84, and the he RF-shied layer 87. In this example, the RF-shield layer 87 may be a layer of metal foil adhered to a carrier sheet, such as polymer substrate, to avoid wrinkling. This also allows the RF-shield layer 87 to be handled separately as a discrete component, which facilitates cutting the RF-shield layer into desired shapes.

FIG. 9 is a front view of a conventional multi-directional antenna 90 mounted on a light pole 91, which also supports a street light 92. In this embodiment, the multi-directional antenna 90 extends an axial dimension 95 (illustrated as vertical) and 360-degree in an azimuthal direction around the axial dimension. Typical multi-directional antennas include omni-directional antennas, and multi-sector panel antenna arrays with three panel antennas facing away from each other in a triangular configuration generally illuminating three sectors covering a 360-degree azimuthal coverage area.

FIG. 10 shows another representative embodiment, a cylindrical RF-absorber assembly 100 positioned over the multi-directional antenna 90 under PIM hunting evaluation. The cylindrical RF-absorber assembly 100 has an axial dimension 105 that is at least co-extensive with the axial dimension 95 of the multi-directional antenna 90. The cylindrical RF-absorber assembly 100 also extends in azimuthal direction 360-degrees around the multi-directional antenna 90.

FIG. 11 is a conceptual illustration showing how to assemble a specific illustrative embodiment of the cylindrical RF-absorber assembly 110. This embodiment includes a linear series of elongated RF-absorbing foam sections, represented by the enumerated RF-absorbing foam section 111, positioned side-by-side along an elongated assembly cover 120. The representative RF-absorbing foam section 111 has a tapered cross-section, which allows the linear series of foam section 111 to be rolled up to form a cylindrical RF-absorber with RF-absorbing pads located inside the assembly cover 120 forming a hollow core.

The representative RF-absorbing foam section 111 includes a relatively larger RF-absorbing layer 112 underlying a relatively smaller non-absorbing foam spacer layer 113 housed within a section cover 114. As an option, an RF-shield layer may be included within the section cover facing outward toward the assembly cover 120. In addition, to create a directional embodiment, one of the sections 115 may be a non-absorbing iris section facing a non-reflecting or openable iris cover portion of the assembly cover form an iris. This particular example illustrates a non-reflecting assembly cover portion 116.

The non-absorbing iris section 115 lacks an RF-absorber to avoid absorbing the RF energy emitted by the antenna positioned inside the assembly at this portion of the assembly. Similarly, the assembly cover 120 includes an a non-reflecting or openable iris cover portion at the iris section to avoid reflecting the RF energy emitted by the antenna positioned inside the assembly at this portion of the assembly.

The cylindrical RF-absorber assembly 110 also includes a disk-shaped RF-absorbing end cap 117. The end cap 117, which may include a layer of RF-absorbing foam adhered to an outward facing layer of assembly cover, without a spacer layer, due to the lower RF radiation in the upward direction from a typical cellular base station antenna. Nevertheless, if desired, the end cap 117 may also include an RF-absorbing layer as with other RF-absorbers. The assembly cover 120 may include an embedded RF-shield layer 121 and a series of heavy-duty tape strips or other adhesive to hold the RF-absorbing foam sections in place. The assembly cover 120 also includes number of straps, represented by the enumerated strap 123, for lifting and attaching the cylindrical assembly 110 to structures. As shown in FIG. 12, the cylindrical RF-absorber assembly is a rolled-up to form a cylindrical shape with one end closed by the end cap 117, and the opposing end open.

FIG. 13 is a sectional view of a representative RF-absorber section 131 for a cylindrical RF-absorber assembly. The representative RF-absorber section 131 includes a relatively larger RF-absorbing layer 132 underlying a relatively smaller non-absorbing spacer layer 133 housed within a section cover 134. This representative embodiment is shown substantially to scale with the RF-absorbing layer 132 and the non-absorbing spacer layer 133 each 2-inches (5 cm) thick. As an option, an RF-shield layer 135 co-extensive with and abutting the outward facing (longer) side of the RF-absorbing layer 132 may be housed within the section cover 134.

FIG. 14A is a sectional view of a full-perimeter cylindrical RF-absorber assembly 140A, which has an axial dimension at least coextensive with the axial dimension of the multi-dimensional antenna 90 inside the assembly (see FIG. 9). In addition, the RF-absorber assembly 140A surrounds the axial dimension 95 of the multi-dimensional antenna 90 a full 360-degrees in an azimuthal direction 148. This particular example of the cylindrical RF-absorber assembly 140A includes eight tapered RF-absorber sections represented by the enumerated RF-absorber section 141, which form concentric segmented rings around the multi-dimensional antenna 90. Closest to the antenna 90, the tapered RF-absorber sections form a ring of non-absorbing spacer segments surrounding the multi-dimensional antenna 90 in the azimuthal direction 148. Further away from the antenna 90, the tapered RF-absorber sections form a ring of RF-absorbing segments surrounding the multi-dimensional antenna 90 in the azimuthal direction 148. Yet further away from the antenna 90, the tapered RF-absorber sections form a ring of RF-shield segments surrounding the multi-dimensional antenna 90 in the azimuthal direction 148. In addition, the assembly cover 145 surrounds these layers in the azimuthal direction 148 still further away from the antenna 90.

FIG. 14B is a sectional view of an alternative full-perimeter cylindrical RF-absorber assembly 140B. The difference between this embodiment and the full-perimeter cylindrical RF-absorber assembly 140B shown in FIG. 14A, is the RF-shield layer 146*b* in the alternative embodiment 140B is embedded in the assembly cover 145.

FIG. 15 is a perspective view of a directional cylindrical RF-absorber assembly 150, which is designed to increase its PIM hunting functionality. FIG. 16 is a sectional view of the directional cylindrical RF-absorber assembly 150 temporarily installed over a multi-directional antenna 160. This version of the cylindrical RF-absorber assembly includes a non-absorbing and non-reflecting iris section 151. The pad of the iris section includes non-absorbing spacer layer 161 without an RF-absorbing layer to avoid attenuating the RF beam 165 transmitted by the antenna 160. Likewise, the assembly cover 153 includes a non-reflecting portion or an opening portion to avoid reflecting the RF beam 165. This particular embodiment illustrates an opening assembly cover portion 155 that swings open on several fabric hinges 151. In an openable embodiment, an opening portion 155 of the assembly cover 153 swings open on a number of fabric hinges represented by the enumerated hinge 154. In a PIM hunting procedure, the cylindrical RF-absorber assembly 150 can be rotated around the centrally located multi-directional antenna 160 until an elevated PIM level is encountered, indicating that a PIM source 166 is aligned with the iris section 151.

FIG. 17 is a sectional view of a full-perimeter RF-absorber panel assembly 170 temporarily installed on a panel antenna 171. This embodiment includes an RF-absorber front panel assembly 172 covering the front side of the panel antenna 171, along with an RF-absorber pad 173 covering the back side of the panel antenna. RF-shield layer side blankets 174a and 174b cover the lateral sides of the panel antenna 171. An extension of a side blanket or a separate top blanket may be placed across the top of the antenna, and the bottom of the antenna, if desired. A number of mounting straps represented by the illustrated a mounting strap 175 removably attaches to opposing sides of the assembly cover 176 and around the mounting structure 14 to removably attach the full-perimeter RF-absorber panel assembly 170 to the mounting structure 14. In the configuration shown in FIG. 17, substantially all of the energy transmitted by the panel antenna 171 is absorbed by the full-perimeter RF-absorber panel assembly 170, similar to the full-perimeter cylindrical RF-absorber assembly 110 shown in FIGS. 10-12.

Since the full-perimeter RF-absorber panel assembly 170 is not designed to rotate around the panel antenna 171, FIG. 18 is a logic flow diagram illustrating a PIM hunting procedure 180 that can be utilized to accomplish a similar directional PIM hunting result. In step 1801, the technician measures PIM at an antenna under evaluation, detecting an elevated PIM level, before installing RF-absorbers. To begin the PIM hunting process, step 1801 is followed by step 1802, in which the technician installs a front RF-absorber panel assembly, a rear RF-absorber panel assembly, and RF-shield side blankets on the antenna, as shown in FIG. 17. Step 1802 is followed by step 1803, in which the technician measures the PIM and determines whether the PIM level has been reduced.

If the PIM level has not been reduced, the "no" branch is followed to step 1804, in which the technician searches for an internal PIM source within the antenna system. If the PIM level has been reduced, the "yes" branch is followed to step 1805, in which the technician removes a first RF-shield side blanket (i.e., the technician start removing the side blankets one at a time). Step 1805 is followed by step 1806, in which the technician measures the PIM and determines whether the PIM level has been reduced. If the PIM level has been reduced, the "yes" branch is followed to step 1807, in which the technician searches a PIM source to that side (i.e., the first side) of the antenna.

If the PIM level has not been reduced, the "no" branch is followed to step 1808, in which the technician removes the second RF-shield side blanket. Step 1808 is followed by step 1809, in which the technician measures the PIM and determines whether the PIM level has been reduced. If the PIM level has been reduced, the "yes" branch is followed to step 1810, in which the technician searches a PIM source to that side (i.e., the second side) of the antenna.

If the PIM level has not been reduced, the "no" branch is followed to step 1811, in which the technician removes the rear RF-absorber panel pad. Step 1811 is followed by step 1812, in which the technician measures the PIM and determines whether the PIM level has been reduced. If the PIM level has been reduced, the "yes" branch is followed to step 1813, in which the technician searches a PIM source to that side (i.e., the rear) of the antenna. If the PIM level has not been reduced, the "no" branch is followed to step 1814, in which the technician searches for the PIM source to the front side of the antenna.

Although particular embodiments of this disclosure have been illustrated, it is apparent that various modifications and embodiments of the disclosure may be made by those skilled in the art without departing from the scope and spirit of the disclosure. It will therefore be appreciated that the present invention provides significant improvements. The foregoing relates only to the exemplary embodiments of the present invention, and that numerous changes may be made therein without departing from the spirit and scope of the invention as defined by the following claims.

The invention claimed is:

1. An RF-absorber assembly for temporary attachment to antenna under evaluation, comprising:
   a non-absorbing spacer layer comprising a first flexible foam pad defining a leading face pointed toward and adjacent to the antenna, further comprising a trailing face pointed away from the antenna;
   an RF-absorbing layer comprising a second flexible foam pad defining a leading face pointed toward the antenna and adjacent to the trailing face of the non-absorbing spacer layer, further comprising a trailing face pointed away from the antenna;
   an RF-shield layer comprising a leading face pointed toward the antenna and adjacent to the trailing face of the RF-absorbing layer, further comprising a trailing face pointed away from the antenna;
   a fabric assembly cover for removably securing the non-absorbing flexible foam pad spacer layer, the RF-absorbing flexible foam pad layer, and the RF-shield layer proximate to the antenna.

2. The RF-absorber assembly of claim 1, wherein:
   The non-absorbing spacer layer consists essentially of a layer of open-cell polyurethane foam;
   The RF-absorbing layer consists essentially of a layer of open-cell lightly carbon-loaded polyurethane foam imparting a single-pass transverse RF attenuation in the range of 8 dB to 15 dB to a 1,900 MHZ signal from the antenna.

3. The RF-absorber assembly of claim 2, wherein the RF-shield layer consists essentially of metal foil.

4. The RF-absorber assembly of claim 3, further comprising a section cover housing the non-absorbing spacer layer, the RF-absorbing layer, and the RF-shield layer.

5. The RF-absorber assembly of claim 1, wherein:
   the antenna is a panel antenna comprising a front face;
   the leading face of the non-absorbing spacer layer is at least coextensive with the front face of the panel antenna;
   the leading face of the RF-absorbing layer is at least coextensive with the front face of the non-absorbing spacer layer;

the leading face of the RF-shield layer is at least coextensive with the trailing face of the RF-absorbing layer.

6. The RF-absorber assembly of claim 1, wherein:
the antenna is a multi-directional antenna having an axial dimension;
the non-absorbing spacer layer surrounds the axial dimension in an azimuthal direction;
the RF-absorbing layer surrounds the axial dimension in an azimuthal direction further away from the antenna than the non-absorbing spacer layer;
the RF-shield layer surrounds the axial dimension in an azimuthal direction further away from the antenna than the RF-absorbing layer.

7. The RF-absorber assembly of claim 1, further comprising:
a plurality of non-absorbing spacer sections;
a plurality of RF-absorbing sections;
a plurality of section covers, each section cover housing a respective non-absorbing spacer layer and a respective RF-absorbing layer;
a plurality of buckles removably attaching each section cover to the assembly cover.

8. The RF-absorber assembly of claim 7, wherein each section cover further houses a respective RF-shield section.

9. The RF-absorber assembly of claim 1, further comprising a plurality of mounting straps attached to the assembly cover, each mounting for removably receiving a connecting strap for removably securing the RF-absorber assembly to a mounting structure supporting the antenna.

10. The RF-absorber assembly of claim 1, further comprising a top mounting strap attached to the assembly cover for removably supporting the RF-absorber assembly from a mounting structure supporting the antenna.

11. The RF-absorber assembly of claim 1, wherein the RF absorber assembly is a first RF absorber assembly removably attached to a front side of the antenna, further comprising:
a second RF absorber assembly removably attached to a rear side of the antenna;
a first RF-shield blanket removably attached to a first lateral side of the antenna;
a second RF-shield blanket removably attached to a second lateral side of the antenna.

12. An RF-absorber assembly for temporary attachment to antenna under evaluation, comprising:
a non-absorbing spacer layer comprising a leading face pointed toward and adjacent to the antenna, further comprising a trailing face pointed away from the antenna;
an RF-absorbing layer comprising a leading face pointed toward the antenna and adjacent to the trailing face of the non-absorbing spacer layer, further comprising a trailing face pointed away from the antenna;
an RF-shield layer comprising a leading face pointed toward the antenna and adjacent to the trailing face of the RF-absorbing layer, further comprising a trailing face pointed away from the antenna;
an assembly cover for removably securing the non-absorbing spacer layer, the RF-absorbing layer, and the RF-shield layer proximate to the antenna;
section cover housing the non-absorbing spacer layer and RF-absorbing layer, wherein the section cover does not house the RF-shield layer.

13. The RF-absorber assembly of claim 12, wherein the RF-shield layer is embedded in the assembly cover.

14. An RF-absorber assembly for temporary attachment to antenna under evaluation, comprising:
a non-absorbing spacer layer comprising a leading face pointed toward and adjacent to the antenna, further comprising a trailing face pointed away from the antenna;
an RF-absorbing layer comprising a leading face pointed toward the antenna and adjacent to the trailing face of the non-absorbing spacer layer, further comprising a trailing face pointed away from the antenna;
an RF-shield layer comprising a leading face pointed toward the antenna and adjacent to the trailing face of the RF-absorbing layer, further comprising a trailing face pointed away from the antenna;
an assembly cover for removably securing the non-absorbing flexible foam pad spacer layer, the RF-absorbing flexible foam pad layer, and the RF-shield layer proximate to the antenna;
an iris section lacking an RF-absorbing layer; and
a window, non-reflecting assembly cover portion, or openable assembly cover portion associated with the iris section.

15. The RF-absorber assembly of claim 14, wherein the RF absorbing layer imparts a single-pass transverse RF attenuation in the range of 8 dB to 15 dB to a 1,900 MHZ signal from the antenna.

16. The RF-absorber assembly of claim 14, wherein the non-absorbing layer comprises open-cell polyurethane foam.

17. The RF-absorber assembly of claim 14, wherein the RF-absorbing layer comprises open-cell lightly carbon-loaded polyurethane foam.

18. The RF-absorber assembly of claim 14, wherein the RF-shield layer comprises metal foil.

19. The RF-absorber assembly of claim 14, wherein:
the non-absorbing layer comprises open-cell polyurethane foam;
the RF-absorbing layer comprises open-cell lightly carbon-loaded polyurethane foam;
the RF-shield layer comprises metal foil.

20. The RF-absorber assembly of claim 19, wherein the RF absorbing layer imparts an RF attenuation in the range of 8 dB to 15 dB to a 1,900 MHZ signal from the antenna.

* * * * *